US012672145B2

(12) United States Patent
Yeo et al.

(10) Patent No.: US 12,672,145 B2
(45) Date of Patent: *Jun. 30, 2026

(54) METHOD AND APPARATUS FOR MAPPING UPLINK CONTROL INFORMATION IN WIRELESS COMMUNICATION SYSTEM

(71) Applicant: Samsung Electronics Co., Ltd., Gyeonggi-do (KR)

(72) Inventors: Jeongho Yeo, Gyeonggi-do (KR); Seunghoon Choi, Gyeonggi-do (KR); Sungjin Park, Gyeonggi-do (KR); Jinyoung Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 139 days.

This patent is subject to a terminal disclaimer.

(21) Appl. No.: 18/522,905

(22) Filed: Nov. 29, 2023

(65) Prior Publication Data

US 2024/0121786 A1      Apr. 11, 2024

Related U.S. Application Data

(63) Continuation of application No. 17/831,850, filed on Jun. 3, 2022, now Pat. No. 11,963,174, which is a
(Continued)

(30) Foreign Application Priority Data

Feb. 13, 2018    (KR) ........................ 10-2018-0018072

(51) Int. Cl.
| | |
|---|---|
| *H04W 72/21* | (2023.01) |
| *H04L 1/1829* | (2023.01) |
| *H04W 72/23* | (2023.01) |

(52) U.S. Cl.
CPC ........... *H04W 72/21* (2023.01); *H04L 1/1861* (2013.01); *H04W 72/23* (2023.01)

(58) Field of Classification Search
CPC .... H04W 72/21; H04W 72/23; H04L 1/1861; H04L 1/0041; H04L 1/0072;
(Continued)

(56) References Cited

U.S. PATENT DOCUMENTS

| 9,326,299 B2 | 4/2016 | Kim et al. |
|---|---|---|
| 11,129,151 B2 | 9/2021 | Park |

(Continued)

FOREIGN PATENT DOCUMENTS

| CN | 104040920 | 9/2014 |
|---|---|---|
| CN | 106130698 | 11/2016 |

(Continued)

OTHER PUBLICATIONS

Chinese Office Action dated Jan. 6, 2024 issued in counterpart application No. 201980011649.4, 7 pages.
(Continued)

*Primary Examiner* — Obaidul Huq
(74) *Attorney, Agent, or Firm* — The Farrell Law Firm, P.C.

(57) ABSTRACT

Provided is a method of a terminal in a wireless communication system, including receiving DCI for scheduling PUSCH transmission, determining a number of coded modulation symbols per layer for transmission of UCI, based on a number of code blocks associated with a UL-SCH, $C_{UL-SCH}$, a value $K_r$ for an r-th code block of the code blocks and a number of bits of the UCI, wherein in case that the DCI includes CBGTI and the CBGTI indicates that the r-th code block associated with the UL-SCH of the PUSCH transmission is not for transmission, the value $K_r$ is determined as 0, and else, the value $K_r$ is determined as a size of the r-th code block for the UL-SCH of the PUSCH trans-
(Continued)

mission; and transmitting, to a base station, the UCI on the PUSCH based on the number of coded modulation symbols per layer.

16 Claims, 12 Drawing Sheets

Related U.S. Application Data continuation of application No. 16/274,937, filed on Feb. 13, 2019, now Pat. No. 11,356,988.

(58) Field of Classification Search
    CPC ... H04L 5/0051; H04L 5/0055; H04L 5/0057; H04L 1/1607; H04L 1/0061; H04L 5/0053; H04L 1/0067; H04L 5/0007
    USPC ......................................... 370/310, 328, 329
    See application file for complete search history.

(56) References Cited

U.S. PATENT DOCUMENTS

| | | | |
|---|---|---|---|
| 2013/0148614 A1 | 6/2013 | Noh et al. | |
| 2014/0056273 A1 | 2/2014 | Jang | |
| 2014/0269454 A1* | 9/2014 | Papasakellariou .... | H04W 72/23 370/280 |
| 2015/0249984 A1 | 9/2015 | Papasakellariou | |
| 2019/0150122 A1 | 5/2019 | Ying | |
| 2019/0230688 A1* | 7/2019 | Huang ................. | H04L 5/0091 |
| 2019/0349965 A1 | 11/2019 | Chakraborty | |
| 2020/0076560 A1 | 3/2020 | Yi et al. | |
| 2020/0188533 A1 | 6/2020 | Fafournoux | |
| 2020/0295899 A1* | 9/2020 | Xiong ................. | H04L 5/0048 |

FOREIGN PATENT DOCUMENTS

| | | |
|---|---|---|
| CN | 107431604 | 12/2017 |
| WO | WO 2016/093600 | 6/2016 |
| WO | WO 2017/030489 | 2/2017 |
| WO | WO 2018/201005 | 11/2018 |

OTHER PUBLICATIONS

Indian Hearing Notice dated Dec. 13, 2023 Issued in counterpart application No. 202037005116, 2 pages.

Korean Office Action dated Dec. 20, 2024 issued in countepart application No. 10-2024-0009116, 9 pages.
Samsung, "CBG-Based DL/UL Retransmissions", R1-1717664, 3GPP TSG RAN WG1 Meeting 90bis, Oct. 9-13, 2017, 9 pages.
Lenovo, Motorola Mobility", Remaining Issues on CBG-based Retransmisison", R1-1719745, 3GPP TSG RAN WG1 Meeting 91, Nov. 27-Dec. 1, 2017, 5 pages.
Ericsson, "Corrections to DCI Formats", R1-1800946, TSG-RAN WG1 Meeting AH 1801, Jan. 22-26, 2018, 8 pages.
Nokia , Nokia Shanghai Bell, "On CBG Based Transmissions", R1-1715547, 3GPP TSG-RAN WG1 NR AH #3, Sep. 18-21, 2017, 7 pages.
International Search Report dated Jun. 3, 2019 issued in counterpart application No. PCT/KR2019/001781, 10 pages.
MediaTek Inc., Discussion on CB Grouping Principles for CBG-based Transmission with single/multi-bit HARQ-ACK Feedback, R1-1707851.
3GPP TSG RAN WG1 Meeting #89, May 15-19, 2017, 6 pages.
LG Electronics, "Text Proposals on PUSCH UCI Multiplexing", R1-1800377, 3GPP TSG RAN WG1 Meeting AH 1801, Jan. 22-26, 2018, 18 pages.
European Search Report dated Sep. 3, 2020 issued in counterpart application No. 19753628.7-1220, 8 pages.
Indian Examination Report dated Apr. 27, 2022 issued in counterpart application No. 202037005116, 5 pages.
Catt, R1-1800255, "Open Issues for UCI Multiplexing on PUSCH", 3GPP TSG RAN WG1 Meeting AH1801, Jan. 22-26, 2018.
R1-1801294, 38.214 V15.0.0, Feb. 12, 2018, 3rd Generation Partnership Project; Technical Specification Group Radio Access Network; NR; Physical Layer Procedures for Data (Release 15), 2018.
Chinese Office Action dated Jul. 19, 2023 issued in counterpart application No. 201980011649.4, 16 pages.
KR Decision to Refuse dated Sep. 19, 2023 issued in counterpart application No. 10-2018-0018072, 9 pages.
European Search Report dated Jul. 6, 2022 issued in counterpart application No. 22168548.0-1206, 10 pages.
3GPP TS 38.212 V15.0.1, 3GPP, 3rd Generation Partnership Project; Technical Specification Group Radio Access Network; NR; Multiplexing and Channel Coding (Release 15), Feb. 2018, 88 pages.
Korean Office Action dated Mar. 15, 2023 issued in counterpart application No. 10-2018-0018072, 3 pages.
Korean Office Action dated Aug. 7, 2025 issued in counterpart application No. 10-2024-0009116, 5 pages.
EP Communication Report dated Feb. 9, 2026 issued in counterpart application No. 2216854.0-1206, 6 pages.

* cited by examiner

METHOD AND APPARATUS FOR MAPPING UPLINK CONTROL INFORMATION IN WIRELESS COMMUNICATION SYSTEM

This application is a continuation of U.S. Ser. No. 17/831, 850, which was filed in the U.S. Patent and Trademark Office (USPTO) on Jun. 3, 2022, issued as U.S. Pat. No. 11,963,174 on Apr. 16, 2024, which is a continuation of U.S. Ser. No. 16/274,937, which was filed in the USPTO on Feb. 13, 2019, issued as U.S. Pat. No. 11,356,988 on Jun. 7, 2022, and claims priority under 35 U.S.C. § 119 to Korean Patent Application No. 10-2018-0018072, which was filed in the Korean Intellectual Property Office on Feb. 13, 2018, the entire disclosure of each of which is incorporated herein by reference.

BACKGROUND

1. Field

The disclosure relates generally to a wireless communication system, and more particularly, to a method and apparatus for mapping uplink control information in the wireless communication system.

2. Description of Related Art

To meet the increasing demand with respect to wireless data traffic after the commercialization of 4th generation (4G) communication systems, extensive research has been conducted on the development of pre-5th generation (5G) communication systems or 5G communication systems, which are also referred to as "beyond 4G network communication systems" or "post long-term evolution (LTE) systems." In order to achieve a high data transmission rate, 5G communication systems are being developed to be implemented in a super-high frequency band (millimeter wave (mmWave)), e.g., a 60 gigahertz (GHz) band.

In order to reduce the occurrence of stray electric waves in such a super-high frequency band and to increase a transmission distance of electric waves in 5G communication systems, various technologies are being considered, such as beamforming, massive multiple input multiple output (MIMO), full dimensional MIMO (FD-MIMO), array antennas, analog beam-forming, and large scale antennas. In order to improve system networks for 5G communication systems, various technologies have been developed, such as evolved small cells, advanced small cells, cloud radio access networks (cloud RANs), ultra-dense networks, device-to-device communication (D2D), wireless backhaul, moving networks, cooperative communication, coordinated multi-points (CoMPs), and interference cancellation. Other technologies have been developed for 5G communication systems, such as hybrid modulation of frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved to the Internet of things (IoT), where distributed configurations, such as objects, exchange information with each other to process the information. Internet of everything (IoE) technology is now being provided, and is related to IoT but is combined with technology for processing big data through connection with a cloud server. In order to implement IoT, various technical components are required, such as sensing technology, wired/wireless communication and network infrastructures, service interfacing technology, and security technology. In recent years, technologies including a sensor network for connecting objects, machine to machine (M2M) communication, and machine type communication (MTC) have been studied. In the IoT environment, intelligent Internet technology services may be provided to collect and analyze data obtained from objects connected to each other, and thus, to enhance human life. As existing information technology (IT) techniques and various industries converge, IoT may be applied to various fields, such as smart homes, smart buildings, smart cities, smart cars or connected cars, smart grids, health care, smart home appliances, and high quality medical services.

Various attempts are being made to apply 5G communication systems to the IoT network. For example, technologies related to sensor networks, M2M communication, and MTC are implemented by using 5G communication technology including beam-forming, MIMO, and array antenna. The application of the cloud RAN as a big data processing technique described above may be an example of convergence of the 5G communication technology and the IoT technology.

A new radio (NR) access technology that is new 5G communication is designed to enable various services to be flexibly multiplexed in time and frequency resources. Therefore, waveform/numerology and a reference signal may be adaptively or freely assigned, based on requirements of a corresponding service. To provide a terminal with an optimal service in wireless communication, data transmission that is optimized by measuring a quality of a channel and interference with respect to the channel is important, making it essential to measure an exact state of the channel. However, unlike 4G communication where channel and interference characteristics are not significantly changed according to a frequency resource, channel and interference characteristics of a 5G channel are significantly changed according to a service. As such, support of a subset in a frequency resource group (FRG) is necessary to divide and measure the channel and interference characteristics.

A type of a service supported in an NR system may be divided into such categories as enhanced mobile broadband (eMBB), massive machine-type communications (mMTC), ultra-reliable and low-latency communication (URLLC). The eMBB seeks to provide fast transmission of large amounts of data, mMTC seeks to provide minimization of terminal power and access to multiple terminals, and URLLC seeks to provide high reliability and low delay. Different requirements may be applied according to a type of a service applied to a terminal.

In such a communication system providing a plurality of services to a user; however, the services tend to be provided individually or at different time periods, which is an inconvenience to the user. Accordingly, there is a need in the art for a method and apparatus for providing the services in a same time period according to characteristics of the services, so as to provide the plurality of services to the user in a more convenient manner.

SUMMARY

An aspect of the disclosure is to address at least the above-mentioned problems and/or disadvantages and to provide at least the advantages described below.

Accordingly, an aspect of the disclosure is to provide a method and apparatus for determining an amount of a resource for transmission of uplink control information (UCI) or the number of coded bits of the UCI, according to the number of actual transmission-target code blocks (CBs), when the terminal transmits the UCI to a base station by using a physical uplink shared channel (PUSCH) in a wireless communication system.

In accordance with an aspect of the disclosure, an operating method of a terminal in a wireless communication system includes determining a value used for determining a size of a resource for transmission of UCI based on code block group transmission information (CBGTI) included in downlink control information (DCI) for scheduling PUSCH transmission, and determining the size of the resource for transmission of the UCI based on the determined value.

In accordance with another aspect of the disclosure, a terminal in a wireless communication system includes a transceiver, and a processor configured to determine a value used for determining a size of resource for transmission of UCI based on CBGTI included in DCI for scheduling PUSCH transmission, and determine the size of the resource for transmission of the UCI based on the determined value.

In accordance with another aspect of the disclosure, a base station in a wireless communication system includes a processor, and a transceiver configured to transmit, to a terminal, DCI for scheduling PUSCH transmission, wherein the DCI includes CBGTI, determine a value used for determining a size of a resource for transmission of UCI based on the CBGTI, determine the size of the resource for transmission of the UCI based on the determined value, and receive, from the terminal, the UCI on the PUSCH by using the determined size of resource.

In accordance with another aspect of the disclosure, a non-transitory computer-readable recording medium is disclosed having recorded thereon a method of a terminal in a wireless communication system, including determining a value used for determining a size of a resource for transmission of UCI based on CBGTI included in DCI for scheduling PUSCH transmission, and determining the size of the resource for transmission of the UCI based on the determined value.

BRIEF DESCRIPTION OF THE DRAWINGS

The above and other aspects, features, and advantages of certain embodiments of the disclosure will be more apparent from the following description taken in conjunction with the accompanying drawings, in which.

4

Figure 5:
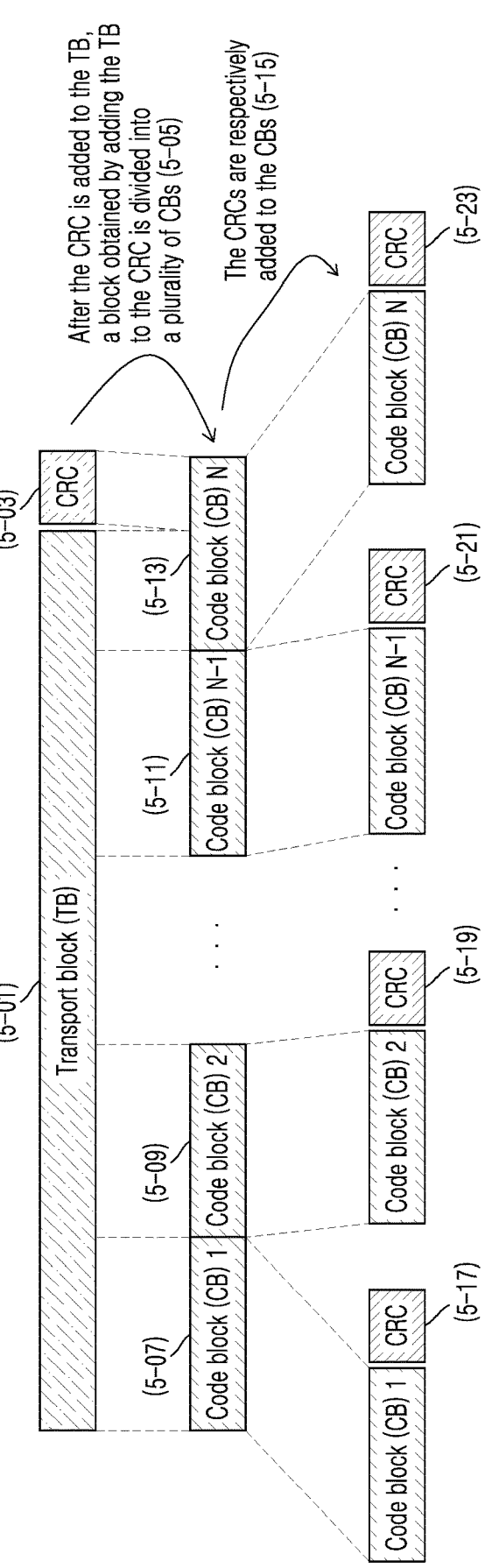
Figure 6:
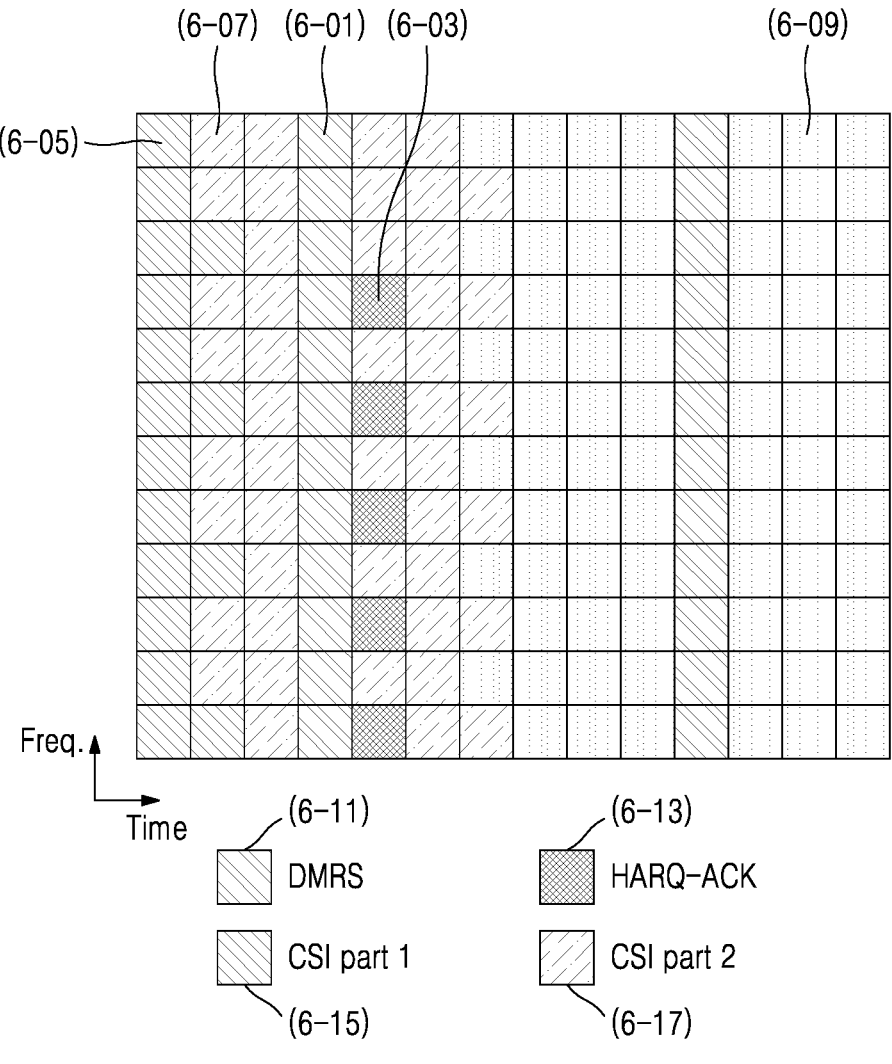
Figure 7A:
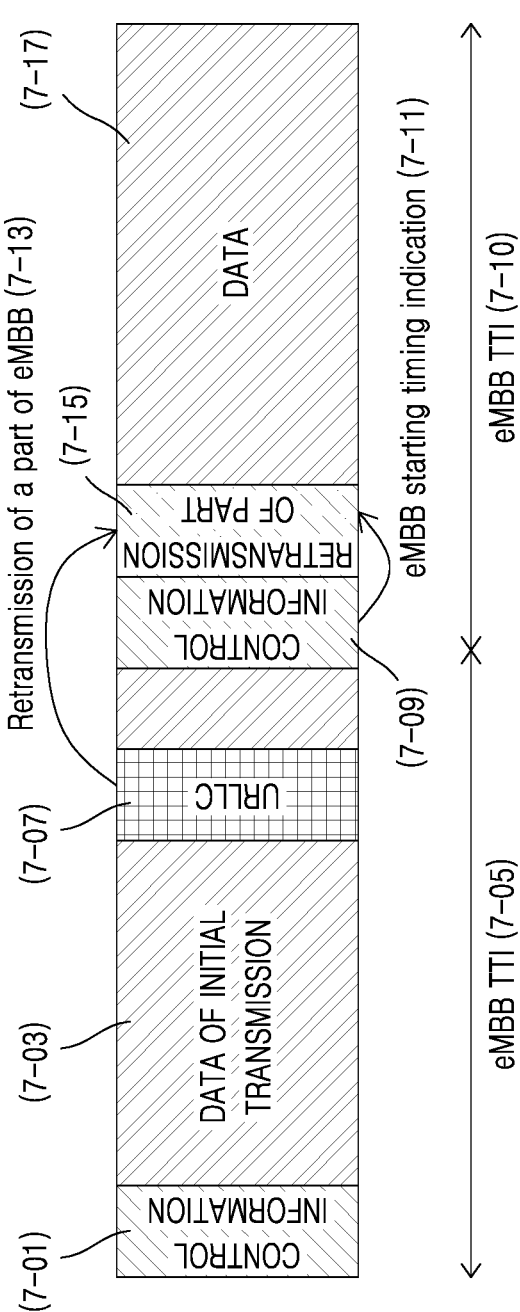
Figure 7B:
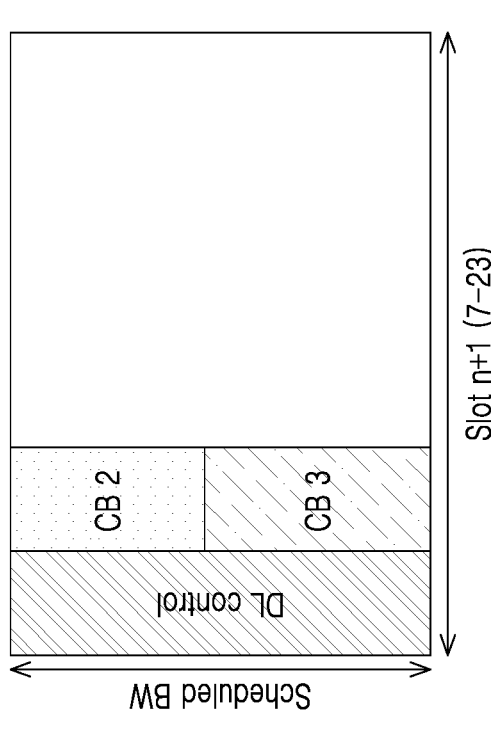
Figure 7B:
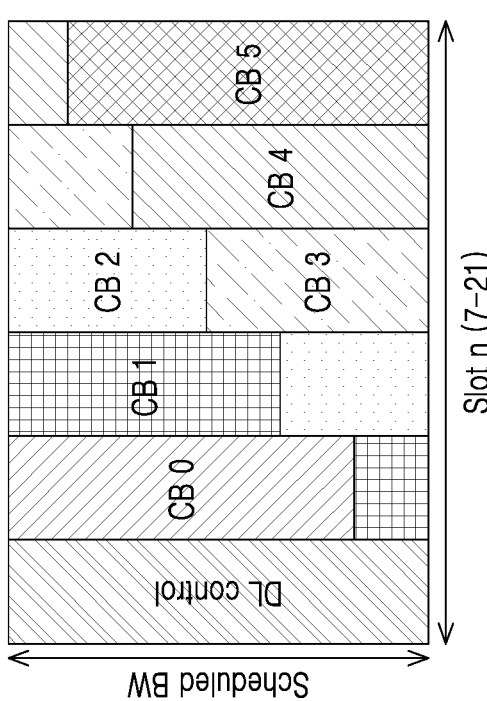
Figure 7C:
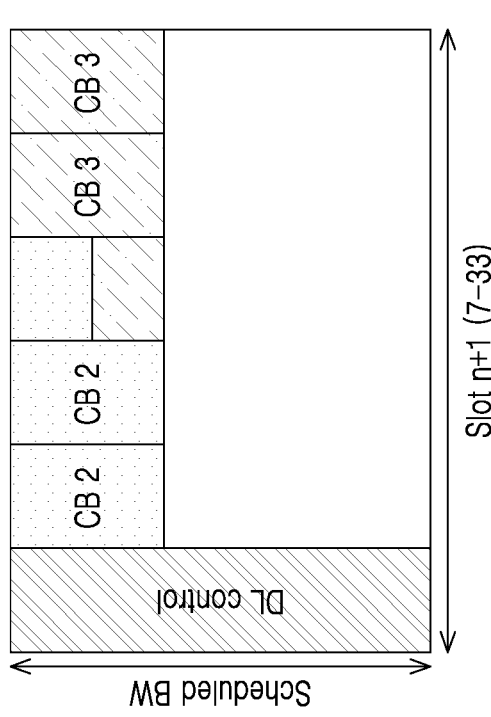
Figure 7C:
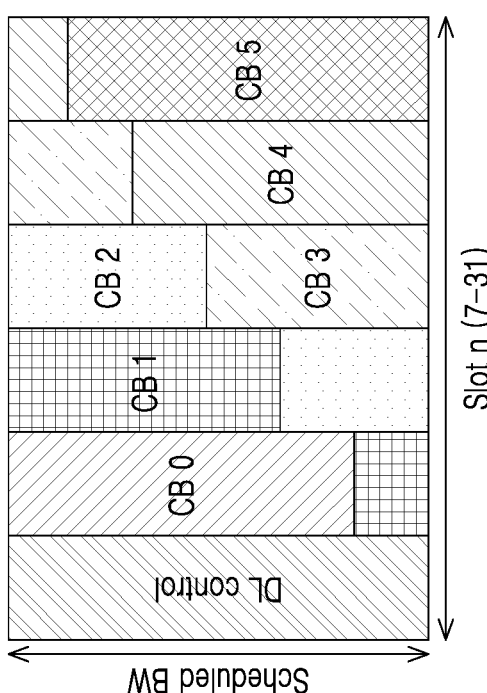
Figure 8:
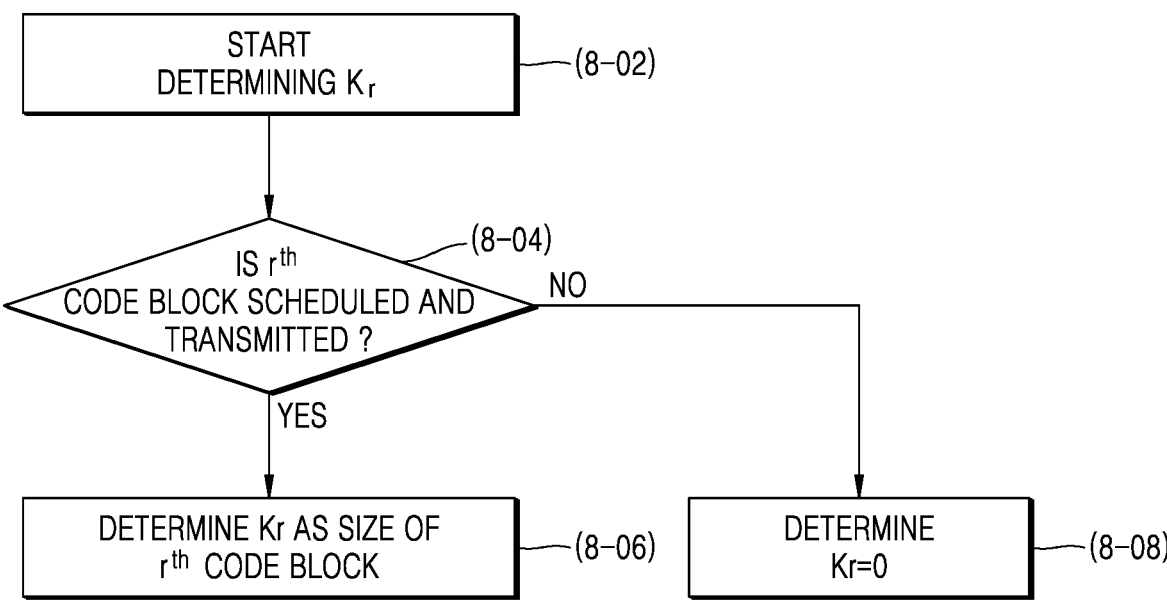
Figure 9:
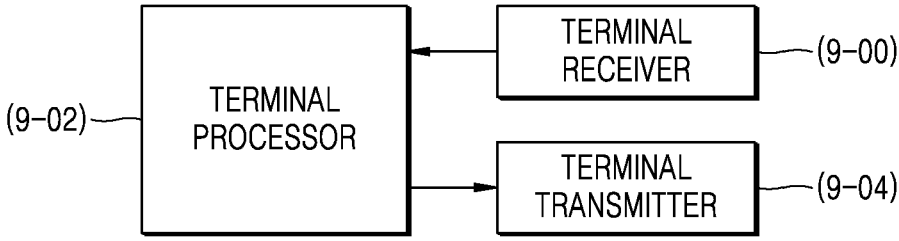

FIG. 5 illustrates a process of dividing one transport block (TB) into a plurality of CBs and adding a cyclic redundancy check (CRC), according to an embodiment;

FIG. 6 illustrates mapping when UCI is transmitted in a PUSCH in an NR system, according to an embodiment;

FIG. 7A illustrates a method of transmitting URLLC on an eMBB data scheduling resource in an NR system, according to an embodiment;

FIG. 7B illustrates a method of transmitting URLLC on an eMBB data scheduling resource in an NR system, according to an embodiment;

FIG. 7C illustrates a method of transmitting URLLC on an eMBB data scheduling resource in an NR system, according to an embodiment;

FIG. 8 illustrates a method of determining a coding bit size of UCI, according to an embodiment;

FIG. 9 is a block diagram of a terminal according to an embodiment; and

Figure 10:
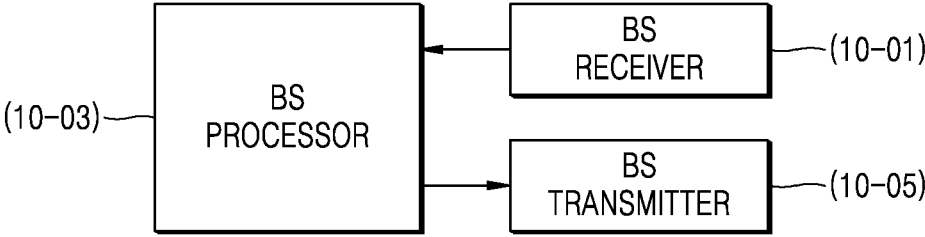

FIG. 10 is a block diagram of a base station (BS) according to an embodiment.

DETAILED DESCRIPTION

Hereinafter, the present disclosure will be described in detail with reference to the accompanying drawings. Detailed descriptions of known functions and configurations incorporated herein will be omitted for the sake of clarity and conciseness.

Throughout the disclosure, the expression "at least one of a, b or c" indicates only a, only b, only c, both a and b, both a and c, both b and c, all of a, b, and c, or variations thereof.

In the present disclosure, components may be exaggerated, omitted, or schematically illustrated in drawings for clarity. The size of each component may not completely reflect the actual size. In the drawings, a component that is the same or is in correspondence is rendered the same reference numeral.

Embodiments of the disclosure may have different forms and should not be construed as being limited to the descriptions set forth herein. Rather, these embodiments are provided so that this disclosure will be thorough and complete and will fully convey the concept of the present disclosure to one of ordinary skill in the art. Throughout the specification, like reference numerals denote like elements.

It will be understood that combinations of blocks in flowcharts or process flow diagrams may be performed by computer program instructions that may be loaded into a processor of a general purpose computer, a special purpose computer, or another programmable data processing apparatus. Thus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus, the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or may be performed in a reverse order according to the corresponding function.

The term "unit" in the embodiments of the disclosure indicates a software component or hardware component such as a field-programmable gate array (FPGA) or an application-specific integrated circuit (ASIC), and performs a specific function. However, the term "unit" is not limited to software or hardware, and may be formed so as to be in an addressable storage medium or to operate one or more processors. Thus, the term "unit" may refer to software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with a fewer number of components and "units", may be divided into additional components and "units", or may be embodied to reproduce one or more central processing units (CPUs) in a device or security multimedia card. The "unit" may include at least one processor in embodiments of the disclosure.

A wireless communication system has evolved from providing initial voice-oriented services to, for example, a broadband wireless communication system providing a high-speed and high-quality packet data service, such as communication standards of high speed packet access (HSPA), LTE or evolved universal terrestrial radio access (E-UTRA), and LTE-A of third generation partnership project (3GPP), high rate packet data (HRPD) and ultra mobile broadband (UMB) of 3GPP2, and 802.16e of the Institute of Electrical and Electronics Engineers (IEEE). A 5G or NR communication standard is being developed for 5G wireless communication systems.

In an LTE system that is a representative example of the broadband wireless communication system, an orthogonal frequency division multiplexing (OFDM) scheme is used in a DL and a single carrier frequency division multiplexing (SC-FDMA) scheme is used in a UL. The UL refers to a wireless link through which a terminal, a UE, or mobile station (MS) transmits data or control signals to a BS or an eNode B, and the DL refers to a wireless link through which a BS transmits data or control signals to a terminal. In the aforementioned multiple access scheme, data or control information of each user is classified or identified by assigning and operating time and frequency resources such that the time and frequency resources for transmitting the data or control information for each user do not overlap each other, thereby establishing orthogonality.

An LTE system employs a hybrid automatic repeat request (HARQ) scheme in which a physical layer retransmits data when a decoding failure occurs in initial transmission. In the HARQ scheme, when a receiver fails to accurately decode data, the receiver transmits a negative acknowledgment (NACK) indicating the decoding failure to the transmitter so that the transmitter may retransmit corresponding data in the physical layer. The receiver combines the data retransmitted by the transmitter with the data whose previous decoding had failed so as to improve data reception performance. In addition, when the receiver accurately decodes the data, an acknowledgment (ACK) indicating successful decoding is transmitted to the transmitter so that the transmitter may transmit new data.

Hereinafter, a BS may be a subject performing resource assignment of a terminal, and may be at least one of a gNode B, an eNode B, a Node B, a BS, a wireless access unit, a BS controller, or a node on a network. A terminal may include a UE, an MS, a cellular phone, a smart phone, a computer, or a multimedia system capable of performing communication functions. In the disclosure, a DL is a wireless transmission path of a signal transmitted from a BS to a terminal, and a UL is a wireless transmission path of a signal transmitted from a terminal to a BS. Embodiments of the disclosure will be described employing an NR system as an example, but may also be applied to other communication systems having a similar technical background or channel form through some modifications within the scope of the disclosure without departing from the scope of the disclosure based on the judgment of one of ordinary skill in the art.

In the disclosure, terms including a physical channel and a signal according to the related art may be interchangeably used with data or a control signal. For example, a physical downlink shared channel (PDSCH) refers to a physical channel for transmitting data, but in the disclosure, PDSCH may refer to data.

Hereinafter, higher signaling is a method of transmitting a signal from a BS to a terminal by using a DL data channel of a physical layer or from a terminal to a BS by using a UL data channel of a physical layer, and may also be referred to as radio resource control (RRC) signaling or medium access control (MAC) control element (CE).

Figure 1:
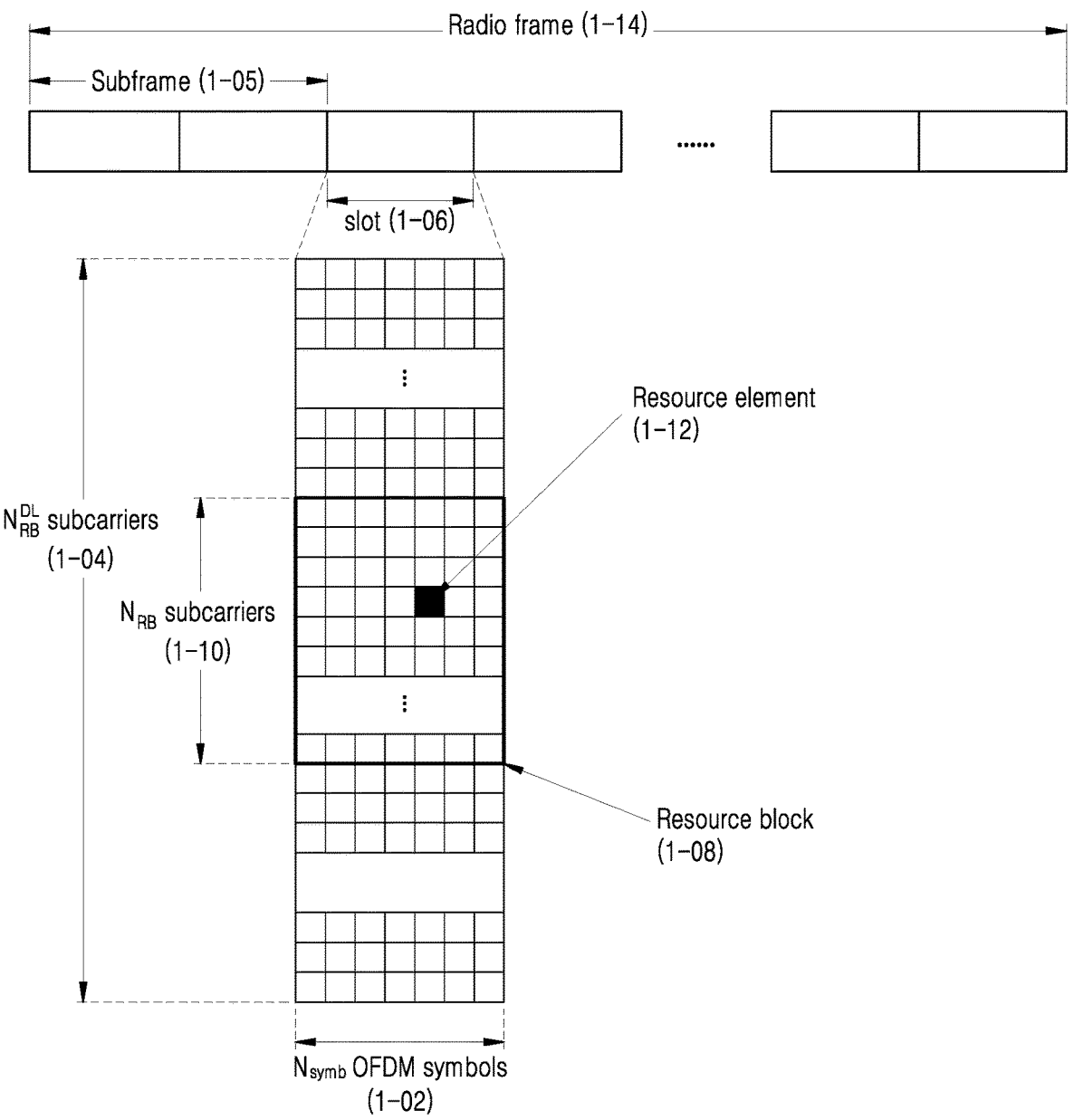
FIG. 1 illustrates a basic structure of a time-frequency domain that is a wireless resource region where data or a control channel is transmitted from a downlink (DL) of an LTE system to which embodiments of the present disclosure are applicable.

FIG. 1 illustrates a basic structure of a time-frequency domain that is a wireless resource region where data or a control channel is transmitted from a DL of an LTE system to which embodiments of the present disclosure are applicable.

Referring to FIG. 1, a horizontal axis represents a time domain and a vertical axis represents a frequency domain. The minimum transmission unit in the time domain is an OFDM symbol, and $N_{symb}$ OFDM symbols 1-02 are gathered to constitute one slot 1-06, and two slots are gathered to constitute one subframe 1-05. The length of the slot may be 0.5 ms, and the length of the subframe may be 1.0 ms. A radio frame 1-14 is a time domain unit composed of 10 subframes. The minimum transmission unit in the frequency domain is a subcarrier, and the transmission bandwidth of the entire system may be composed $$N_{RB}^{DL}$$

subcarriers 1-04 in total.

In the time-frequency domain, a basic unit of a resource is a resource element (RE) 1-12, and may be indicated as an OFDM symbol index and a subcarrier index. A resource block (RB) 1-08 or a physical resource block (PRB) may be defined as $N_{symb}$ successive OFDM symbols 1-02 in the time domain and $N_{RB}$ successive subcarriers 1-10 in the frequency domain. Accordingly, one RB 1-08 may be composed of $N_{symb} \times N_{RB}$ REs 1-12. In general, the minimum transmission unit of data is an RB unit.

It is conventional in the LTE system that $N_{symb}$ is 7 and $N_{RB}$ is 12, and $$N_{RB}^{DL}$$

and $N_{RB}$ are in proportion to a bandwidth of a system transmission band. However, a system other than the LTE system may use a different value. A data rate may be increased in proportion to the number of RBs being scheduled to a terminal. In the LTE system, 6 transmission bandwidths may be defined and operated. In a frequency division duplex (FDD) system that divides and operates a DL and a UL through a frequency, the transmission bandwidth of the DL and the transmission bandwidth of the UL may differ from each other. A channel bandwidth indicates a radio frequency (RF) bandwidth that corresponds to the system transmission bandwidth.

Table 1 below illustrates a corresponding relation between the system transmission bandwidth and the c Channel bandwidth, which relation is defined in the LTE system. For example, in the LTE system having the channel bandwidth of 10 MHz, the transmission bandwidth is composed of 50 RBs.

TABLE 1

| | Channel bandwidth $BW_{Channel}$ [MHz] | | | | | |
| --- | --- | --- | --- | --- | --- | --- |
| | 1.4 | 3 | 5 | 10 | 15 | 20 |
| Transmission bandwidth configuration $N_{RB}$ | 6 | 15 | 25 | 50 | 75 | 100 |

DL control information may be transmitted within first N OFDM symbols in a subframe. In an embodiment of the disclosure, N={1, 2, 3} in general. Accordingly, the value N may be varied for each subframe based on the amount of control information to be transmitted in a current subframe. The control information to be transmitted may include a control channel transmission interval indicator indicating the number of OFDM symbols through which the control information is transmitted, scheduling information on DL data or UL data, and a HARQ ACK/NACK signal.

In the LTE system, the scheduling information on the DL data or the UL data is transferred from a BS to a terminal through downlink control information (DCI), which is defined in various formats and may indicate, according to each format, whether the scheduling information is UL data scheduling information (UL grant) or DL data scheduling information (DL grant), whether the DCI is compact DCI having a small amount of control information, whether spatial multiplexing using multiple antennas is applied, or whether the DCI is DCI for controlling power. For example, DCI format 1 that is the scheduling control information (DL grant) of the DL data may include at least one of a plurality of pieces of control information, as follows:

Resource assignment type 0/1 flag: This indicates whether a resource assignment scheme is type 0 or type 1. Type 0 assigns resources in units of resource block groups (RBGs) through application of a bitmap type. In the LTE system, a basic unit of scheduling is an RB that is expressed as a time and frequency domain resource, and the RBG is composed of a plurality of RBs to be considered as the basic unit of scheduling in type 0. Type 1 assigns a specific RB in the RBG.

RB assignment: This indicates an RB that is assigned for data transmission. An expressed resource is determined based on a system bandwidth and a resource assignment scheme.

Modulation and coding scheme (MCS): This indicates a modulation scheme used for data transmission and a size of a TB that is data to be transmitted.

HARQ process number: This indicates a process number of HARQ.

New data indicator: This indicates whether HARQ transmission is initial transmission or retransmission.

Redundancy version: This indicates sets of coded bits of HARQ.

Transmit power control (TPC) command for physical uplink control channel (PUCCH): This indicates a control command for transmission power in a PUCCH that is a UL control channel.

The DCI may be transmitted through a physical downlink control channel (PDCCH) (or control information, hereinafter, interchangeably used) that is a DL physical control channel or an enhanced PDCCH (EPDCCH) (or enhanced control information, hereinafter, interchangeably used) after passing through a channel coding and modulation process.

In general, the DCI is scrambled by a specific radio network temporary identifier (RNTI) or terminal identifier independently with respect to each terminal, is added with a CRC, is channel-coded, and then is configured as an independent PDCCH to be transmitted. The PDCCH may be mapped and transmitted for the control channel transmission interval in the time domain. A mapping location of the PDCCH in the frequency domain may be determined by an identifier (ID) of each terminal, and the PDCCH may be transmitted through a transmission bandwidth of an entire system.

The DL data may be transmitted through a PDSCH that is a physical channel for transmitting the DL data. The PDSCH may be transmitted after the control channel transmission interval, and scheduling information, such as a specific mapping location or a modulation scheme in the frequency domain, may be determined based on the DCI to be transmitted through the PDCCH.

The BS notifies the terminal of a modulation scheme applied to the PDSCH to be transmitted and a transport block size (TBS) to be transmitted, by using an MCS included in the control information constituting the DCI. In an embodiment of the disclosure, the MCS may be composed of 5 bits or may be composed of more or less bits than 5 bits. The TBS corresponds to a size of the BS before channel coding for error correction is applied to the TB to be transmitted by the BS.

In the disclosure, a TB may include a MAC header, a MAC CE, at least one MAC service data unit (SDU), and padding bits, and may indicate a data unit or a MAC protocol data unit (PDU) transmitted from a MAC layer to a physical layer.

The modulation scheme supported in the LTE system is quadrature phase shift keying (QPSK), 16QAM, or 64QAM, and respective modulation orders ($Q_m$) correspond to 2, 4, and 6. 2 bits per symbol may be transmitted in QPSK modulation, 4 bits per symbol may be transmitted in 16QAM modulation, and 6 bits per symbol may be transmitted in 64QAM modulation. A modulation scheme of 256QAM or more may be used according to system modification.

Figure 2:
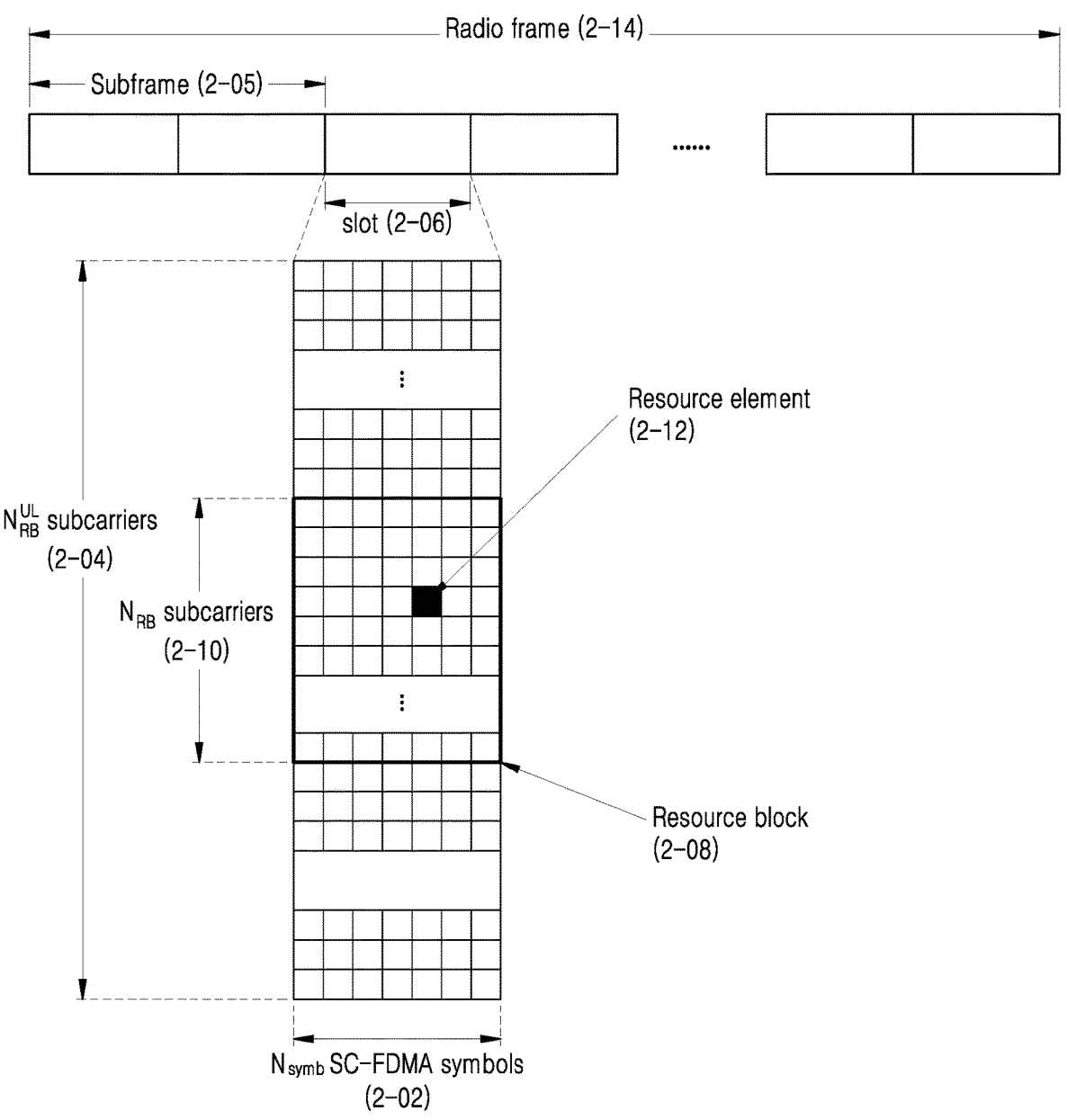
FIG. 2 illustrates a basic structure of a time-frequency domain that is a wireless resource region where data or a control channel is transmitted from an uplink (UL) of an LTE-advanced (LTE-A) system to which embodiments of the present disclosure are applicable.

FIG. 2 illustrates a basic structure of a time-frequency domain that is a wireless resource region where data or a control channel is transmitted from an UL of an LTE-A system to which embodiments of the present disclosure are applicable.

Referring to FIG. 2, a horizontal axis represents a time domain and a vertical axis represents a frequency domain. The minimum transmission unit in the time domain is an SC-FDMA symbol 2-02, and $N_{symb}$ SC-FDMA symbols may be gathered to constitute one slot 2-06. Two slots may be gathered to constitute one subframe 2-05. The minimum transmission unit in the frequency domain is a subcarrier, and a transmission bandwidth of the entire system is composed of $$N_{RB}^{UL}$$

subcarriers 2-04 in total.

$$N_{RB}^{UL}$$

may have a value in proportion to a system transmission bandwidth.

In the time-frequency domain, a basic unit of a resource is an RE 2-12, and may be defined as an SC-FDMA symbol index and a subcarrier index. An RB pair 2-08 may be defined as $N_{symb}$ successive SC-FDMA symbols in the time domain and $N_{RB}$ successive subcarriers 2-10 in the frequency domain. Accordingly, one RB may be composed of $N_{symb} \times N_{RB}$ REs. In general, the minimum transmission unit of data or control information is an RB unit. A PUCCH may be mapped on the frequency domain corresponding to 1 RB and may be transmitted for one subframe.

In the LTE system, the timing relation between a PDSCH that is a physical channel for transmitting DL data or a PDCCH/EPDCCH including a semi-persistent scheduling (SPS) release and a UL physical channel (PUCCH or PUSCH) through which a corresponding HARQ ACK/NACK is transmitted may be defined. As an example, in the LTE system that operates as an FDD, the HARQ ACK/NACK corresponding to the PDSCH transmitted in the (n−4)-th subframe or the PDCCH/EPDCCH including the SPS release is transmitted by the PUCCH or PUSCH in the n-th subframe.

In the LTE system, a DL HARQ adapts an asynchronous HARQ scheme in which data re-transmission time is not fixed. That is, when the HARQ NACK is fed back from the terminal with respect to the initially-transmitted data transmitted by the BS, the BS may freely determine transmission time of retransmission data through the scheduling operation. The terminal buffers data that is determined as an error, as a result of decoding the received data for the HARQ operation, and then performs combining with the next retransmission data.

When the terminal receives, in a subframe n, a PDSCH including DL data transmitted from the BS, the terminal may transmit, in a subframe n+k, UL control information including HARQ ACK or NACK of the DL data to the BS through a PUCCH or a PUSCH. In this regard, k may be differently defined based on FDD or time division duplex (TDD) and its subframe configuration of the LTE system. As an example, in an FDD LTE system, k is fixed to 4, whereas in a TDD LTE system, k may be changed according to the subframe configuration and a subframe number.

In the LTE system, unlike DL HARQ, UL HARQ adapts a synchronous HARQ scheme in which data transmission time is fixed. That is, a UL/DL timing relation among a PUSCH that is a physical channel for transmitting the UL data, a PDCCH that is a DL control channel preceding the PUSCH, and a physical hybrid indicator channel (PHICH) that is a physical channel through which the DL HARQ ACK/NACK corresponding to the PUSCH is transmitted may be fixed by following rules.

When the terminal receives, in the subframe n, the PDCCH including UL scheduling control information transmitted from the BS or the PHICH through which the DL HARQ ACK/NACK is transmitted, the terminal transmits, in the subframe n+k, the UL data corresponding to the control information through the PUSCH. In this regard, k may be differently defined based on the FDD or TDD and its configuration of the LTE system.

As an example, in the FDD LTE system, k is fixed to 4. In contrast, in the TDD LTE system, k may be changed according to the subframe configuration and the subframe number. In the FDD LTE system, when the BS transmits a UL scheduling approval or a DL control signal and data to the terminal in the subframe n, the terminal receives the UL scheduling approval or the DL control signal and data in the subframe n. First, when the UL scheduling approval is received in the subframe n, the terminal transmits the UL data in a subframe n+4. When the DL control signal and data are received in the subframe n, the terminal transmits HARQ ACK or NACK with respect to the DL data in the subframe n+4. Accordingly, a preparation time for the terminal to receive the UL scheduling approval and transmit the UL data or to receive the DL data and transmit the HARQ ACK or NACK is 3 ms corresponding to three subframes.

When the terminal receives, in a subframe i, the PHICH that carries the DL HARQ ACK/NACK from the BS, the PHICH may correspond to the PUSCH transmitted by the terminal in a subframe i-k. In this regard, k is differently defined based on the FDD or TDD and its configuration of the LTE system. As an example, k is fixed to 4 in the FDD LTE system, but k may be changed according to the subframe configuration and the subframe number in the TDD LTE system.

Figure 3:
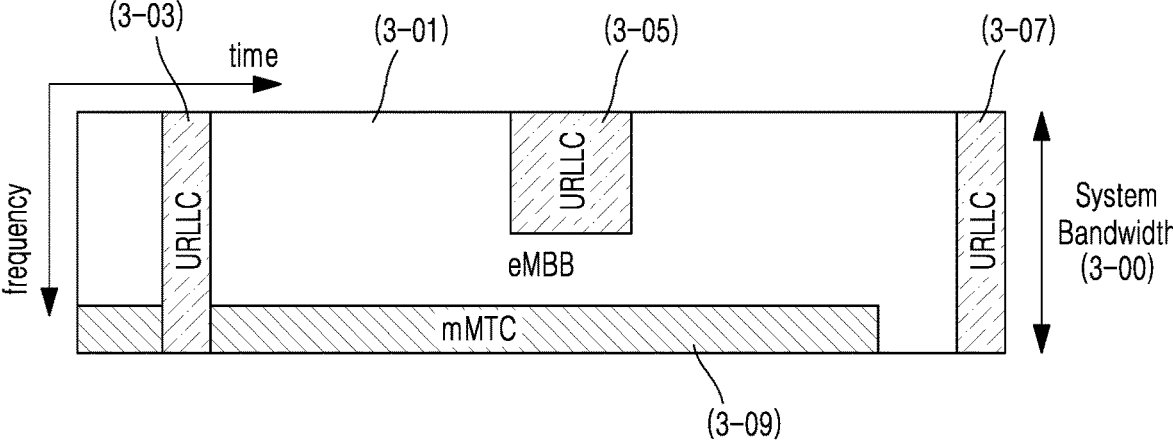
FIG. 3 illustrates a method of assigning a plurality of items of data for eMBB, URLLC, and mMTC, which are services considered in a 5G or NR system, in time-frequency resources to which embodiments of the disclosure are applicable.

FIG. 3 illustrates a method of assigning a plurality of items of data for eMBB, URLLC, and mMTC, which are services considered in a 5G or NR system, in time-frequency resources to which embodiments of the disclosure are applicable.

FIG. 3 illustrates how frequency and time resources are assigned for information transmission in each system, in an example in which a plurality of items of data for eMBB, URLLC, and mMTC are assigned in an entire system frequency bandwidth 3-00. When URLLC data 3-03, 3-05, and 3-07 are generated and are required to be transmitted while eMBB data 3-01 and mMTC data 3-09 are assigned to a specific frequency band and transmitted, regions to which the eMBB data 3-01 and the mMTC data 3-09 are already assigned may be emptied or transmission of the eMBB data 3-01 and the mMTC data 3-09 may be stopped at the regions and the URLLC data 3-03, 3-05, and 3-07 may be transmitted. Because the URLLC from among the services of the eMBB, the URLLC, and the mMTC requires reduction of a delay time, the URLLC data 3-03, 3-05, and 3-07 may be transmitted by being assigned to some of resources to which the eMBB data 3-01 is assigned. When the URLLC data 3-03, 3-05, and 3-07 are transmitted by being additionally assigned to the resources to which the eMBB data 3-01 is assigned, the eMBB data 3-01 may not be transmitted in overlapping frequency-time resources, and accordingly, transmission performance of the eMBB data 3-01 may deteriorate. That is, a transmission failure of the eMBB data 3-01 may occur due to assignment of the URLLC data 3-03, 3-05, and 3-07.

Figure 4:
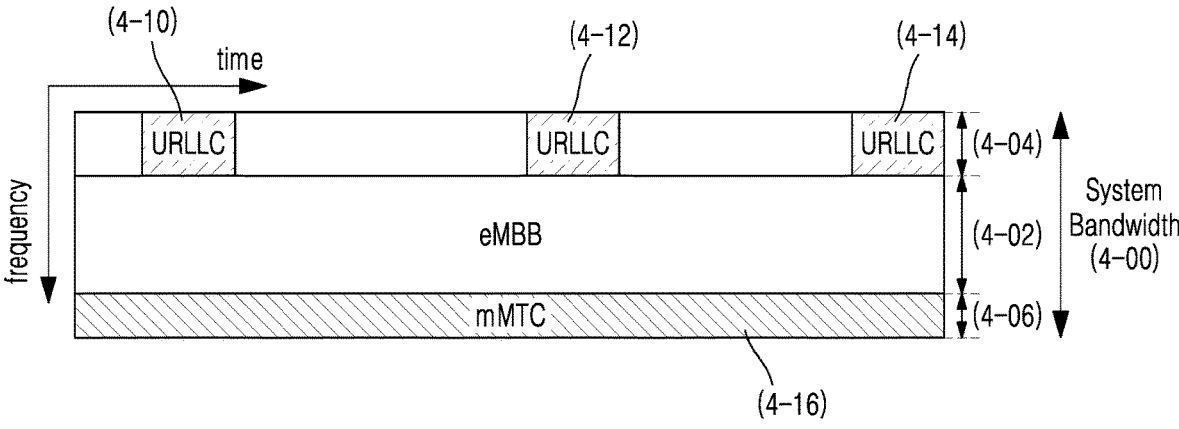
FIG. 4 illustrates a method of assigning a plurality of items of data for eMBB, URLLC, and mMTC, which are services considered in a 5G or NR system, in time-frequency resources, according to an embodiment.

FIG. 4 illustrates a method of assigning a plurality of items of data for eMBB, URLLC, and mMTC, which are services considered in a 5G or NR system, in time-frequency resources, according to an embodiment.

FIG. 4 illustrates how frequency and time resources are assigned for information transmission in each system, in a method of using each of sub-bands 4-02, 4-04, and 4-06 divided from an entire system frequency bandwidth 4-00 so as to transmit a service and data. Information related to setting of a sub-band may be pre-determined, and transmitted from a BS to a terminal through higher signaling. According to another embodiment, the BS or a network node may arbitrarily divide the information related to the sub-band and may provide services without transmitting the information to the terminal. In FIG. 4, it is assumed that the sub-band 4-02 is used to transmit eMBB data, the sub-band 4-04 is used to transmit URLLC data, and the sub-band 4-06 is used to transmit mMTC data.

In an embodiment, a length of a transmission time interval (TTI) taken to transmit the URLLC data may be shorter than a length of a TTI taken to transmit the eMBB data or the mMTC data. A response to information related to the URLLC data may be transmitted faster than in eMBB data or mMTC data, and accordingly, information may be transmitted or received with low latency.

FIG. 5 illustrates a process of dividing one TB into a plurality of CBs and adding a CRC, according to an embodiment.

When data is transmitted in a wireless communication system, particularly, in an existing LTE system, transmission may be made in a unit of a TB, which may be divided into a plurality of CBs, and channel coding may be performed in a unit of CB. After initial translation, retransmission is performed in a unit of a TB, and an entire TB has to be retransmitted even when decoding fails in only one CB. Thus, retransmission in a unit of a CB or CB group may be required, and an NR system may provide a method of performing retransmission in a unit of a CB group.

Referring to FIG. 5, a CRC 5-03 may be added at the front or back of one TB 5-01 to be transmitted in a UL or a DL. The CRC 5-03 may have 16 bits, 24 bits, or a pre-fixed bit number, or may have a bit number varied according to a channel state, and may be used to determine whether channel coding is successful. A block obtained by adding the TB 5-01 to the CRC 5-03 may be divided into a plurality of CBs 5-07, 5-09, 5-11, and 5-13 in step 5-05. Largest sizes of the CBs 5-07, 5-09, 5-11, and 5-13 may be pre-determined, and in this case, the last CB 5-13 may have a size smaller than the other CBs 5-07, 5-09, and 5-11 or may be adjusted to have the same length as the other CBs 5-07, 5-09, and 5-11 by having 0, a random value, or 1 inserted into the last CB 5-13.

CRCs 5-17, 5-19, 5-21, and 5-23 may be respectively added to the CBs 5-07, 5-09, 5-11, and 5-13 in step 5-15. Each of the CRCs 5-17, 5-19, 5-21, and 5-23 may have 16 bits, 24 bits, or a pre-fixed number of bits, and may be used to determine the success of channel coding. However, in another embodiment of the disclosure, the CRC 5-03 added to the TB 5-01 and the CRCs 5-17, 5-19, 5-21, and 5-23 added to the CBs 5-07, 5-09, 5-11, and 5-13 may be omitted according to a type of a channel code to be applied to a CB. For example, when a low density parity check code (LDPCC) is applied to a CB instead of a turbo code, the CRCs 5-17, 5-19, 5-21, and 5-23 to be added respectively to the CBs 5-07, 5-09, 5-11, and 5-13 may be omitted. However, the CRCs 5-17, 5-19, 5-21, and 5-23 may be added to the CBs 5-07, 5-09, 5-11, and 5-13 even when the LDPCC is applied. The CRCs 5-17, 5-19, 5-21, and 5-23 may be added or omitted even when a polar code is used.

As shown in FIG. 5, in a TB to be transmitted, a maximum length of a CB is determined based on a type of channel coding to be applied thereto, and a TB and CRC added to the TB are divided into CBs according to the maximum length of the CB. In an LTE system, a CRC for a CB is added to a CB, coded bits are determined as a data bit generated by encoding the CB and CRC via a channel code, and the following processes are performed on each of the coded bits to determine a rate-matching bit number. In other words, a parity to be transmitted is determined.

Start Rate-Matching Bit Number Determination or Transmission Bits Collection

Operation 1: Denoting by E the rate matching output sequence length for the r-th coded block, and by $rv_{idx}$ the redundancy version number for this transmission ($rv_{idx}$=0, 1, 2 or 3), the rate matching output bit sequence being $^e k$, k=0, 1, . . . , E-1.

Operation 2: Define by G the total number of bits available for the transmission of one transport block.

Operation 3: Set, in Equation (1):

$$G'=G/(N_L \cdot Q_m) \qquad (1)$$

where $Q_m$ is equal to 2 for QPSK, 4 for 16QAM, 6 for 64QAM and 8 for 256QAM, and for transmission diversity: $N_L$ is equal to 2; otherwise: $N_L$ is equal to the number of layers a transport block is mapped onto.

Operation 4: Set, in Equation (2):

$$\gamma=G' \bmod C \qquad (2)$$

where C is the number of code blocks of a TB
if: r≤C−γ−1 set, in Equation (3):

$$E=N_L \cdot Q_m \cdot \lfloor G'/C \rfloor \qquad (3)$$

else
set, in Equation (4):

$$E=N_L \cdot Q_m \cdot \lceil G'/C \rceil \qquad (4)$$

end if
Operation 5: Set, in Equation (5):

$$k_0 = R_{subblock}^{TC} \cdot 2 \cdot \left[ \frac{N_{cb}}{8R_{subblock}^{TC}} \cdot rv_{idx} + 2 \right], \qquad (5)$$

where $$R_{subblock}^{TC}$$

is the number of rows of block interleaver,

```
set k = 0 and j = 0
while { k < E }
    if w(k₀+j)modNcb ≠< NULL >
        eₖ = w(k₀+j)modNcb
        k = k +1
    end if
    j = j +1
end while
```

End Rate-Matching Bit Number Determination or Transmission Bits Collection

The operations above may be summarized as follows.

Operation 1: E is defined such that a length of a rate-matching result of an r-th CB is indicated.

Operation 2: G indicates information bits mappable for transmitting a TB. For example, G may be calculated according to the number of REs to which TB is mapped*a modulation order*a layer number.

Operation 3: G' is a value obtained by dividing G by the layer number and the modulation order.

Operation 4: Considering G', a mappable information bit amount E as close as possible to all CBs is calculated, and lengths of rate-matching results of transmitted CBs are similar per CB.

Operation 5: Mapping information bits are configured such that coded bits of a CB are mapped only by the value E of the length of a rate-matching result of a CB calculated in operation 4.

In operation 4, when the bit number E of the rate-matching result mappable per CB is determined, the transmittable resource amount G' is divided by the number of CBs included in the TB.

FIG. 6 illustrates mapping when uplink control information (UCI) is transmitted in a PUSCH in an NR system, according to an embodiment. When a demodulation reference signal (DMRS) is mapped (6-01, 6-11), HARQ-ACK information may be mapped to a symbol (6-03, 6-13) that is directly next to a symbol to which the DMRS is mapped. A plurality of pieces of channel state information (CSI) part 1 may be mapped to symbols from a first symbol (6-05, 6-15). Then, a plurality of pieces of CSI part 2 may be mapped to spare resource regions from the front of resource regions for PUSCH transmission (6-07, 6-17). CSI part 1 may include a rank indicator (RI), a CSI-RS indicator (CRI), and a channel quality indicator (CQI) feedback for a first codeword, and CSI part 2 may include a precoding matrix indicator (PMI) and a CQI feedback for a second codeword.

When HARQ-ACK information is channel-coded, the number of modulation symbols $$Q'_{ACK}$$

that are coded according to each layer may be calculated in Equation (6) as follows.

$$Q'_{ACK} = \min \left\{ \left\lceil \frac{(O_{ACK} + L_{ACK}) \cdot \beta^{PUSCH}_{offset} \cdot \sum_{l=0}^{N^{PUSCH}_{symb,all}-1} M^{UCI}_{SC}(l)}{\sum_{r=0}^{C_{UL-SCH}-1} K_r} \right\rceil , \right. \tag{6}$$

$$\left. a \cdot \sum_{l=l_0}^{N^{PUSCH}_{symb,all}-1} M^{UCI}_{SC}(l) \right\}$$

In Equation (6), $O_{ACK}$ indicates the number of bits of the HARQ-ACK information, and $L_{ACK}$ indicates the number of bits of CRCs added to the HARQ-ACK information.

$$M^{PUSCH}_{SC}$$

indicates the number of subcarriers assigned for PUSCH transmission, and $$N^{PUSCH}_{symb}$$

indicates the number of symbols assigned for PUSCH transmission and excludes symbols for DMRS transmission.

$\beta^{PUSCH}_{offset}$ is given by $\beta^{PUSCH}_{offset} = \beta^{HARQ-ACK}_{offset}$, and may be determined as a value indicated by higher signaling and DCI. $C_{UL-SCH}$ indicates the number of code blocks of an uplink shared channel or the number of code blocks transmitted in a PUSCH, and K r indicates a size of an $r^{th}$ code block from among the code blocks.

$$M^{UCI}_{SC}(l)$$

indicates the number of REs that are used by an $I^{th}$ OFDM symbol to transmit UCI, and $$N^{PUSCH}_{symb,all}$$

indicates the number of OFDM symbols that are assigned for PUSCH transmission and include the symbols for DMRS transmission. When an $I^{th}$ symbol includes a DMRS for a PUSCH, $$M^{UCI}_{SC}(l) = 0.$$

When the $I^{th}$ symbol does not include the DMRS for the PUSCH, $$M^{UCI}_{SC}(l) = M^{PUSCH}_{SC} - M^{PT-RS}_{SC}(l), \text{ where } M^{PT-RS}_{SC}(l)$$

indicates the number of subcarriers for a phase tracking reference signal (PTRS). In the above, $\alpha \in \{0.5, 0.65, 0.8, 1\}$. $l_0$ is an index of a first symbol of a PUSCH excluding a DMRS, the first symbol being after a first DMRS symbol.

$$\beta^{HARQ-ACK}_{offset}$$

indicates that four values in Table 2 below are previously delivered to a terminal through higher signaling, and which of the four values delivered via higher signaling is to be used may be indicated from 2 bits of the DCI.

TABLE 2

| $I^{HARQ-ACK}_{offset,0}$ or $I^{HARQ-ACK}_{offset,1}$ or $I^{HARQ-ACK}_{offset,2}$ | $\beta^{HARQ-ACK}_{offset}$ |
|---|---|
| 0 | 1.000 |
| 1 | 2.000 |

TABLE 2-continued

| $I_{offset,0}^{HARQ-ACK}$ or $I_{offset,1}^{HARQ-ACK}$ or $I_{offset,2}^{HARQ-ACK}$ | $\beta_{offset}^{HARQ-ACK}$ |
|---|---|
| 2 | 2.500 |
| 3 | 3.125 |
| 4 | 4.000 |
| 5 | 5.000 |
| 6 | 6.250 |
| 7 | 8.000 |
| 8 | 10.000 |
| 9 | 12.625 |
| 10 | 15.875 |
| 11 | 20.000 |
| 12 | 31.000 |
| 13 | 50.000 |
| 14 | 80.000 |
| 15 | 126.000 |
| 16 | Reserved |
| 17 | Reserved |
| 18 | Reserved |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

When information of CSI part 1 is channel-coded, $Q'_{CIS-part}1$ that is the number of modulation symbols that are coded according to each layer may be calculated in Equation (7) as follows.

$$Q'_{CSI-1} = \min\left\{\left[\frac{(O_{CSI-1} + L_{CSI-1}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r}\right], \left(a \cdot \sum_{l=0}^{N_{symb,all}^{PUSCH}-1} M_{SC}^{UCI}(l)\right) - Q'_{ACK}\right\} \quad (7)$$

In Equation (7), $O_{CSI-1}$ indicates the number of bits of the information of the CSI part 1, and $L_{CSI-1}$ indicates the number of bits of CRCs added to the CSI part 1.

$$M_{SC}^{PUSCH}$$

indicates the number of subcarriers assigned for PUSCH transmission, and $$N_{symb}^{PUSCH}$$

indicates the number of symbols assigned for PUSCH transmission and excludes symbols for DMRS transmission.

$\beta_{offset}^{PUSCH}$ is given by $\beta_{offset}^{PUSCH} = \beta_{offset}^{CSI-part1}$, and may be determined as a value indicated by higher signaling and DCI. $C_{UL-SCH}$ indicates the number of code blocks of an uplink shared channel or the number of code blocks transmitted in a PUSCH, and $K_r$ indicates a size of a $r^{th}$ code block from among the code blocks. When a HARQ-ACK bit number is greater than 2 and HARQ-ACK information is channel-coded, $Q'_{ACK}$ indicates the number of modulation symbols that are coded according to each layer. When the HARQ-ACK bit number is equal to or less than 2, $Q'_{ACK}$ is determined as $$Q'_{ACK} = \sum_{l-0}^{N_{symb,all}^{PUSCH}-1} \overline{M}_{sc,rvd}^{ACK}(l) \cdot \overline{M}_{sc,rvd}^{ACK}(l)$$

indicates the number of REs reserved for an $I^{th}$ OFDM symbol to use to transmit UCI, and $$N_{symb,all}^{PUSCH}$$

indicates the number of OFDM symbols that are assigned for PUSCH transmission and include the symbols for DMRS transmission.

$$M_{SC}^{UCI}(l)$$

indicates the number of REs used by the $I^{th}$ OFDM symbol to transmit the UCI, and $$N_{symb,all}^{PUSCH}$$

indicates the number of OFDM symbols that are assigned for PUSCH transmission and include the symbols for DMRS transmission.

When an $I^{th}$ symbol includes a DMRS for a PUSCH, $$M_{SC}^{UCI}(l) = 0.$$

When the $I^{th}$ symbol does not include the DMRS for the PUSCH, $$M_{SC}^{UCI}(l) = M_{SC}^{PUSCH} - M_{SC}^{PT-RS}(l), \text{ and } M_{SC}^{PT-RS}(l)$$

indicates the number of subcarriers for a PTRS. In FIG. 7, $\alpha \in \{0.5, 0.65, 0.8, 1\}$.

When information of the CSI part 2 is channel-coded, $Q'_{SCI-part2}$ that is the number of modulation symbols that are coded according to each layer may be calculated in Equation (8) as follows.

$$Q'_{CSI-2} = \min\left\{\left[\frac{(O_{CSI-2} + L_{CSI-2}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r}\right],\right. \quad (8)$$

-continued $$\left( a \cdot \sum_{l=0}^{N_{symb,all}^{PUSCH}-1} M_{SC}^{UCI}(l) \right) - Q'_{ACK} - Q'_{CSI-1} \right\}$$

In Equation (8), $Q'_{CSI-2}$ indicates the number of bits of information of the CSI part 2, and $L_{CSI-2}$ indicates the number of bits of CRCs added to the CSI part 2.

$$M_{SC}^{PUSCH}$$

indicates the number of subcarriers assigned for PUSCH transmission, and $$N_{symb}^{PUSCH}$$

indicates the number of symbols assigned for PUSCH transmission and excludes symbols for DMRS transmission.

$\beta_{offset}^{PUSCH}$ is given by $\beta_{offset}^{PUSCH} = \beta_{offset}^{CSI-part2}$, and may be determined as a value indicated by higher signaling and DCI. $C_{UL-SCH}$ indicates the number of code blocks of an uplink shared channel or the number of code blocks transmitted in a PUSCH, and $K_r$ indicates a size of a $r^{th}$ code block from among the code blocks.

When a HARQ-ACK bit number is greater than 2 and HARQ-ACK information is channel-coded, $Q'_{ACK}$ indicates the number of modulation symbols that are coded according to each layer. When the HARQ-ACK bit number is equal to or less than 2, $Q'_{ACK}=0$. When information of the CSI part 1 is channel-coded, $Q_{CSI-part1}$ indicates the number of modulation symbols that are coded according to each layer.

$$M_{SC}^{UCI}(l)$$

indicates the number of REs used by the $l^{th}$ OFDM symbol to transmit the UCI, and $$N_{symb,all}^{PUSCH}$$

indicates the number of OFDM symbols that are assigned for PUSCH transmission and include the symbols for DMRS transmission. When an $l^{th}$ symbol includes a DMRS for a PUSCH, $$M_{SC}^{UCI}(l) = 0.$$

When the $l^{th}$ symbol does not include the DMRS for the PUSCH, $$M_{SC}^{UCI}(l) = M_{SC}^{PUSCH} - M_{SC}^{PT-RS}(l), \text{ and } M_{SC}^{PT-RS}(l)$$

indicates the number of subcarriers for a PTRS. In Equation (8), $\alpha \in \{0.5, 0.65, 0.8, 1\}$.

Hereinafter, an eMBB service is referred to as a first type service, and data for eMBB is referred to as first type data. The first type service or the first type data is not limited to the eMBB, but may correspond to when high-speed data transmission is required or broadband transmission is performed. A URLLC service is referred to as a second type service, and data for URLLC is referred to as second type data. The second type service or the second type data is not limited to the URLLC, but may correspond to when low latency is required or ultra-reliable transmission is necessary, or may correspond to another system in which both low-latency and ultra-reliability are required. An mMTC service is referred to as a third type service, and data for mMTC is referred to as third type data. The third type service or the third type data is not limited to the mMTC, but may correspond to when low speed, wide coverage, or low power is required. It is understood herein that the first type service may or may not include the third type service.

In order to transmit three types of services or data as described above, different physical layer channel structures may be used for the respective types. For example, at least one of a TTI length, a frequency resource assignment unit, a control channel structure, and a data mapping method may differ.

Although three types of services and three types of data have been described, more types of services and corresponding data may exist, and the disclosure may be applied thereto.

In order to describe a method and apparatus provided in an embodiment of the disclosure, the expression "physical channel" and term "signal" in an existing LTE or LTE-A system may be used. However, the disclosure may be applied to a wireless communication system other than the LTE or LTE-A system.

As described above, disclosed is a method of defining transmitting and receiving operations of a terminal and a BS for transmitting first to third type services or data, and of operating terminals that receive different types of services or data scheduling together in the same system. In the disclosure, the first to third type terminals receive the first to third type services or data scheduling, and may be the same terminals or different terminals.

FIG. 7A illustrates a method of transmitting URLLC on an eMBB data scheduling resource in an NR system, according to an embodiment.

Referring to FIG. 7A, a BS schedules eMBB data 7-03 to a terminal a by using a control signal 7-01. Thereafter, when eMBB data 7-03 is transmitted, a part for URLLC data 7-07 of a resource onto which the eMBB data is to be mapped is used to transmit other data 7-07 to the terminal a or another terminal b. Thereafter, a part 7-15 of the eMBB data that has or has not been transmitted to the terminal a is retransmitted at a next TTI 7-10. The unit of the partial retransmission may be a CB or a CB group including one or more CBs. The eMBB control signal 7-01 transfers scheduling information for the eMBB data 7-03 to terminal a. When URLLC data is generated during transmission of the eMBB data 7-03, the BS transmits a URLLC control signal and data to terminal b (7-07). The transmission of the URLLC control signal and data is performed by mapping the URLLC control signal and the data 7-07 onto a resource to be transmitted, without mapping a part of the existing scheduled eMBB data 7-03 onto the resource. Accordingly, a part of the eMBB is not transmitted at the existing TTI 7-05, and as a result, the eMBB terminal may fail to decode the eMBB data. Terminal a or terminal b may be a terminal of FIG. 9.

To compensate for the failure, the BS may retransmit a part of the eMBB data, which was not transmitted at the TTI 7-05, at the TTI 7-10 (7-13). The partial transmission is performed at the TTI 7-10 after the initial transmission, and may be performed without receiving HARQ-ACK information for the initial transmission from the terminal (for example, terminal a). Through the partial transmission, scheduling information may be transferred from a control signal region 7-09 of a next TTI. When the eMBB data or other data 7-17 is transmitted from the control signal region 7-09 of the next TTI to the other terminal (for example, terminal b), the control signal region 7-09 of the next TTI may include information 7-11 about a symbol location at which the resource mapping of the eMBB data or other data 7-17 starts. The information may be transferred in partial bits of DCI transmitted from the control signal region 7-09. Using the information about the symbol location at which resource mapping of the eMBB data or other data 7-17 starts, retransmission of the part 7-15 that corresponds to the previous initial transmission may be performed at a specific symbol. The eMBB control signal 7-01 or 7-09 of FIG. 7 may not be transferred in the entire indicated region, but may be transferred only in the partial region and in a partial frequency band other than the entire frequency band.

In FIG. 7A, the partial retransmission 7-15 is performed at the next TTI because a part of the eMBB is not transmitted for transmission of the URLLC data 7-07. However, the partial retransmission may be used in such a manner that the BS randomly retransmits a specific part of data although it is not caused by the URLLC data transmission.

It is described that retransmission of the part 7-15 is performed at the next TTI so as to transmit the URLLC data 7-07 because a part of the eMBB was not transmitted, and in this regard, the retransmission of the part 7-15 may be discriminated as the initial transmission of the corresponding part. That is, the terminal that has received the retransmission of the part 7-15 at the next TTI 7-10 does not perform HARQ decoding by combining the part 7-15 with the part received at the previous TTI 7-05, but may perform separate decoding by using only the retransmitted part 7-15 at the next TTI 7-10. It is described that the retransmission is performed from a first symbol after the control signal at the TTI 7-10 after the initial transmission, but the location of the retransmission may be variously changed. Although DL transmission has been described as an example in the embodiment of the disclosure, the retransmission may also be easily applicable to UL transmission.

FIG. 7B illustrates a method of transmitting URLLC on an eMBB data scheduling resource in an NR system, according to an embodiment.

FIG. 7C illustrates a method of transmitting URLLC on an eMBB data scheduling resource in an NR system, according to an embodiment.

As shown in FIGS. 7B and 7C, CB2 and CB3 from among initially transmitted 6 CBs are retransmitted in slot n 7-21 or slot n 7-31. In this manner, only a partial CB or a CB-group (CBG) of an initially transmitted TB may be retransmitted in slot n+1 7-23 or slot n+1 7-33 of an NR system.

In the disclosure, operations of the BS and the terminal in a retransmission method of a CBG unit are described. The expressions CBG unit retransmission, CB unit retransmission, partial retransmission, and CBG retransmission may be interchangeably used.

An amount of a resource region in which UCI is transmitted or the number of bits after the UCI is encoded is determined, is mapped to a part of resources assigned to a PUSCH, and is transmitted. When the number of coding bits of the UCI is determined by considering the number of bits of CBs of a TB to be transmitted to the PUSCH, it should be considered when retransmission in a CBG unit is set.

When $N\_\{CBG_{,max}\}$ denotes a CBG number or a maximum CBG number set by a BS with respect to a terminal, $N\_\{CBG_{,max}\}$ and $N_{CBG,max}$ may be interchangeably used. The number of CBs included in a scheduled TB is referred to as C. When a TB is scheduled, an actual CBG number may be determined to be $M=\min(N_{CBG,max}, C)$, and $\min(x, y)$ may denote a smaller value from among x and y. CBs of C included in the TB may be grouped based on the following rule to form M CBGs.

First mod(C, M) CBGs each include ceil(C/M) or $\lceil C/M \rceil$ CBs.

Last M-mod(C,M) CBGs each include floor(C/M) or $\lfloor C/M \rfloor$ CBs.

Ceiling (or ceil)(C/M) or $\lceil C/M \rceil$ denotes a minimum integer that is not less than C/M, and floor(C/M) or $\lfloor C/M \rfloor$ denotes a maximum integer that is not greater than C/M. For example, when C/M is 4.3, ceil(C/M) is 5 and floor(C/M) is 4. According to the above rule, CBs are sequentially grouped from a front CBG.

As described above, when a maximum CBG number set with respect to a terminal is $N_{CBG,max}$, DCI transmitted to schedule CBG unit retransmission may be set to include $N_{CBG,max}$ bits for CBG transmission information (CBGTI), which indicates which CBGs are transmitted in current scheduling. For example, when the BS sets $N_{CBG,max}=4$ with respect to the terminal, one TB may include maximum 4 CBGs, DCI may include 4 bits to indicate CBGTI, and each bit may indicate information about whether each CBG is transmitted. For example, when DCI includes bits of 1111 and there are four CBGs, each bit is 1 indicating that all CBGs are transmitted. As another example, when DCI includes bits of 1100 and there are four CBGs, only first and second CBGs are transmitted.

First Embodiment

In a first embodiment of the disclosure, provided is a method and apparatus for determining a coded bit number of UCI with which a coding rate of the UCI may have an appropriate value.

When HARQ-ACK information is channel-coded in a current NR system, $$Q'_{ACK}$$

that is the number of modulation symbols that are coded according to each layer may be calculated by using Equation (9) as follows.

$$Q'_{ACK} = \min\left\{\left\lceil \frac{(O_{ACK} + L_{ACK}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r} \right\rceil, \quad a \cdot \sum_{l=l_0}^{N_{symb,all}^{PUSCH}-1} M_{SC}^{UCI}(l) \right\} \quad (9)$$

In Equation (9), $O_{ACK}$ indicates the number of bits of the HARQ-ACK information, and $L_{ACK}$ indicates the number of bits of CRCs added to the HARQ-ACK information.

$$M_{sc}^{PUSCH}$$

indicates the number of subcarriers assigned for PUSCH transmission, and $$N_{symb}^{PUSCH}$$

indicates the number of symbols assigned for PUSCH transmission and excludes symbols for DMRS transmission.

$\beta_{offset}^{PUSCH}$ is given by $\beta_{offset}^{PUSCH} = \beta_{offset}^{HARQ-ACK}$, and may be determined as a value indicated by higher signaling and DCI. $C_{UL-SCH}$ indicates the number of code blocks of an uplink shared channel or the number of code blocks transmitted in a PUSCH, and $K_r$ indicates a size of a $r^{th}$ code block from among the code blocks.

$$M_{SC}^{UCI}(l)$$

indicates the number of REs that are used by an $I^{th}$ OFDM symbol to transmit UCI, and $$N_{symb,all}^{PUSCH}$$

indicates the number of OFDM symbols that are assigned for PUSCH transmission and include the symbols for DMRS transmission.

When an $I^{th}$ symbol includes a DMRS for a PUSCH, $$M_{SC}^{UCI}(l) = 0.$$

When the $I^{th}$ symbol does not include the DMRS for the PUSCH, $$M_{SC}^{UCI}(l) = M_{SC}^{PUSCH} - M_{SC}^{PT-RS}(l), \text{ where } M_{SC}^{PT-RS}(l)$$

indicates the number of subcarriers for a PTRS. In Equation (9), $\alpha \in \{0.5, 0.65, 0.8, 1\}$. $l_0$ is an index of a first symbol of a PUSCH excluding a DMRS, the first symbol being after a first DMRS symbol. The number of coding bits of the HARQ-ACK information may be determined based on the aforementioned parameters of Equation (9).

When a terminal, to which retransmission of a CBG unit is set in transmission of UL data, retransmits a PUSCH including only a part of a CBG unit, $Q'_{ACK}$ may be calculated by using Equation (9) so as to transmit UCI to the PUSCH in the corresponding retransmission. Therefore, when only a part of a CBG is retransmitted, $$\sum_{r=0}^{C_{UL-SCH}-1}$$

$K_r$ may be different from a total sum of sizes of code blocks included in the PUSCH, and may be greater than a total sum of sizes of code blocks that are actually transmitted. Thus, $Q'_{ACK}$ may be determined to be smaller than an actual necessity value, and thus, when HARQ-ACK is coded and then transmitted, a coding rate may become greater than 1, and in this case, a receiver cannot perform decoding.

For example, it is assumed that, for initial transmission, PUSCH transmission is scheduled with MCS 24, 50 PRB, 12 symbols except for a DMRS, and 2 layers. In this case, it is assumed that a maximum of 8 CBGs are set to the terminal. 64QAM may be used as scheduling information, a coding rate may be about 0.754, TBS may be 65,568, and one CB may be included in one CBG. It is assumed that, in the aforementioned scheduling, transmission of one CBG failed in the initial transmission, and that $\alpha=1$. For scheduling of retransmission of one CBG, resource assignment and scheduling are performed with MCS 22 (64QAM, coding rate=0.650), 10 PRB, and 6 symbols, and when a PUSCH for retransmission is transmitted and 16 bits of HARQ-ACK are transmitted together in the PUSCH, $Q'_{ACK}$ may be determined by using Equation (10) as follows.

$$Q'_{ACK} = \tag{10}$$

$$\min\left(\left\lceil \frac{(16+6)\cdot 6 \cdot \beta_{offset}^{PUSCH}}{65592} \right\rceil \cdot \sum_{l=0}^{5} 123\right) = \min\left(\left\lceil 0.24 \cdot \beta_{offset}^{PUSCH} \right\rceil, 600\right)$$

Based on $$\beta_{offset}^{PSUCH}, O_{ACK}/Q'_{ACK}$$

that is a coding rate of $Q'_{ACK}$ and HARQ-ACK may be calculated as in Table 3 below.

TABLE 3

| $I_{offset,0}^{HARQ-ACK}$ or $I_{offset,1}^{HARQ-ACK}$ or $I_{offset,2}^{HARQ-ACK}$ | $\beta_{offset}^{HARQ-ACK}$ | $Q'_{ACK}$ | Coding rate of HARQ-ACK |
|---|---|---|---|
| 0 | 1.000 | 1 | 22.00 |
| 1 | 2.000 | 1 | 22.00 |
| 2 | 2.500 | 1 | 22.00 |
| 3 | 3.125 | 1 | 22.00 |
| 4 | 4.000 | 1 | 22.00 |
| 5 | 5.000 | 2 | 11.00 |
| 6 | 6.250 | 2 | 11.00 |
| 7 | 8.000 | 2 | 11.00 |
| 8 | 10.000 | 3 | 7.33 |
| 9 | 12.625 | 4 | 5.50 |
| 10 | 15.875 | 4 | 5.50 |
| 11 | 20.000 | 5 | 4.40 |
| 12 | 31.000 | 8 | 2.75 |
| 13 | 50.000 | 13 | 1.69 |
| 14 | 80.000 | 20 | 1.10 |
| 15 | 126.000 | 31 | 0.71 |

According to the aforementioned calculations, a coding rate of HARQ-ACK becoming less than 1 is only when 126 is selected as $$\beta_{offset}^{HARQ-ACK},$$

which may be a significant limitation in decoding of HARQ-ACK. For example, when a value of 126 is not included in four values of $$\beta_{offset}^{HARQ-ACK}$$

which are selected through higher signaling, UCI may not be transmitted in a PUSCH when a CBG unit is retransmitted.

Thus, the above problem may be cured by using a total sum of sizes of transmitted code blocks, in consideration of currently transmitted code blocks, instead of using $$\sum_{r=0}^{C_{UL-SCH}-1}$$

$K_r$ that is a total sum of all code blocks. $K_r$ may be defined by using pseudo-code 1 or pseudo-code 2.

Start Pseudo-Code 1

When a $r^{th}$ code block is not scheduled, it is defined that $K_r=0$.

When the $r^{th}$ code block is scheduled, $K_r$ is set as a size of the $r^{th}$ code block.

End Pseudo-Code 1

Start Pseudo-Code 2

When the $r^{th}$ code block is not for transmission as indicated by CBGTI in the scheduling DCI, $\quad K_r=0$ $\quad$ Else $\quad K_r$ is set as a size of the $r^{th}$ code block size for UL-SCH of the PUSCH transmission;

End Pseudo-Code 2 pseudo-code 1 and pseudo-code 2 may be changed to pseudo-code 1a and pseudo-code 2a below.

Start Pseudo-Code 1a

When an $r^{th}$ code block is not scheduled, it is defined that $K_r=0$, and when the $r^{th}$ code block is scheduled, $K_r$ is set as a size of the $r^{th}$ code block.

End Pseudo-Code 1a

Start Pseudo-Code 2a $K_r=0$ when the $r^{th}$ code block is not for transmission as indicated by CBGTI in the scheduling DCI, and otherwise, $K_r$ is set as a size of the $r^{th}$ code block for UL-SCH of the PUSCH transmission.

End Pseudo-Code 2a

When pseudo-code 1 or pseudo-code 2 is applied, Equation (10) may be set as Equation (11) as follows.

$$Q'_{ACK} = \tag{11}$$

$$\min\left(\left\lceil \frac{(16+6)\cdot 120\cdot 6\cdot \beta_{offset}^{PUSCH}}{8199} \right\rceil \cdot \sum_{l=0}^{5} 123\right) = \min\left(\left\lceil 1.93\cdot \beta_{offset}^{PUSCH}\right\rceil, 600\right)$$

Bashed on $$\beta_{offset}^{PUSCH}, O_{ACK}/Q'_{ACK}$$

that is a coding rate of $Q'_{ACK}$ and HARQ-ACK may be calculated as in Table 4 below.

TABLE 4

| $I_{offset,0}^{HARQ-ACK}$ or $I_{offset,1}^{HARQ-ACK}$ or $I_{offset,2}^{HARQ-ACK} \beta_{offset}^{HARQ-ACK}$ | $Q'_{ACK}$ | Coding rate of HARQ-ACK |
|---|---|---|
| 0 | 1.000 | 2 | 11.00 |
| 1 | 2.000 | 4 | 5.50 |
| 2 | 2.500 | 5 | 4.40 |
| 3 | 3.125 | 7 | 3.14 |
| 4 | 4.000 | 8 | 2.75 |
| 5 | 5.000 | 10 | 2.20 |
| 6 | 6.250 | 13 | 1.69 |
| 7 | 8.000 | 16 | 1.38 |
| 8 | 10.000 | 20 | 1.10 |
| 9 | 12.625 | 25 | 0.88 |
| 10 | 15.875 | 31 | 0.71 |
| 11 | 20.000 | 39 | 0.56 |
| 12 | 31.000 | 60 | 0.37 |
| 13 | 50.000 | 97 | 0.23 |
| 14 | 80.000 | 155 | 0.14 |
| 15 | 126.000 | 244 | 0.09 |

According to the aforementioned calculations, a coding rate of HARQ-ACK becomes less than 1 only when $$\beta_{offset}^{HARQ-ACK}$$

is selected between 12.625 and 126, and compared to Table 3, the number of cases is increased resulting in improved decoding performance with respect to HARQ-ACK.

Alternatively, instead of using $$\sum_{r=0}^{C_{UL-SCH}-1}$$

$K_r$ in Equation (9) above, calculation may be performed by using expression (1) or expression (2), as follows.

$$\sum_{r=0}^{c'_{UL-SCH}-1} K_r$$

In expression (1) above, $$c'_{UL-SCH}$$

indicates the number of code blocks that are included in UL-SCH and are currently scheduled for transmission, and $K_r$ indicates a size of an $r^{th}$ code block from among the transmitted code blocks.

$$c'_{UL-SCH}\cdot K'$$

In expression (2) above, $$c'_{UL-SCH}$$

indicates the number of code blocks that are included in UL-SCH and are currently scheduled for transmission, and K' indicates a size of one code block. Equation 4 may be applied to a case where all code blocks have a same size.

An example of HARQ-ACK information has been described above, but in Equation (12) for CSI part 1 and Equation (13) for CSI part 2, provided below, $K_r$ may be defined by using pseudo-code 1 or pseudo-code 2 as $$\sum_{r=0}^{C_{UL-SCH}-1}$$

$K_r$ and may be applied.

(12)

$$Q'_{CSI-1} =$$

$$\min\left\{ \left[ \frac{(O_{CSI-1} + L_{CSI-1}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r} \right], \right.$$

$$\left. \left( a \cdot \sum_{l=0}^{N_{symb,all}^{PUSCH}-1} M_{SC}^{UCI}(l) \right) - Q'_{ACK} \right\}$$

(13)

$$Q'_{CSI-2} = \min\left\{ \left[ \frac{(O_{CSI-2} + L_{CSI-2}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r} \right], \right.$$

$$\left. \left( a \cdot \sum_{l=0}^{N_{symb,all}^{PUSCH}-1} M_{SC}^{UCI}(l) \right) - Q'_{ACK} - Q'_{CSI-1} \right\}$$

By using a method provided in the disclosure, HARQ-ACK, CSI part 1, and CSI part 2 may be coded with an appropriate coding rate and then may be transceived.

In the above, Equation (9), Equation (12), and Equation (13) may be changed, and in the disclosure, to appropriately determine a coding rate of UCI, $Q'_{ACK}$, $Q'_{CSI-part1}$, and $Q'_{CSI-part2}$ may be determined, such as by using [pseudo-code 1], [pseudo-code 2], expression (1), or expression (2).

FIG. 8 illustrates a method of determining a coding bit size of UCI, according to an embodiment.

In step 8-02, at least one of a BS or a terminal may start a process of determining $K_r$ when HARQ-ACK information is transmitted in a PUSCH.

In step 8-04, at least one of the BS and the terminal may determine whether a $r^{th}$ code block is scheduled. When CBGTI is not present, the terminal may assume that all code blocks are transmitted, and when the CBGTI is present in scheduling DCI, the terminal may determine which code block is to be transmitted, based on the CBGTI.

In step 8-06, when the $r^{th}$ code block is scheduled and then is transmitted, at least one of the BS or the terminal may determine $K_r$ as a size of the $r^{th}$ code block.

In step 8-08, when the $r^{th}$ code block is not scheduled and is not transmitted, at least one of the BS or the terminal may determine $K_r$ as 0.

FIG. 9 is a block diagram of a terminal according to an embodiment.

As illustrated in FIG. 9, the terminal according to the disclosure may include a terminal receiver 9-00, a terminal transmitter 9-04, and a terminal processor 9-02. The terminal receiver 9-00 and the terminal transmitter 9-04 may be collectively referred to as a transceiver. The transceiver may transmit or receive a signal to or from a BS. The signal may include control information and data. In this regard, the transceiver may include an RF transmitter for up-converting and amplifying a frequency of a transmitted signal, and an RF receiver for amplifying low-noise and down-converting a frequency of a received signal. The transceiver may receive a signal via a wireless channel, may output the signal to the terminal processor 9-02, and may transmit a signal output from the terminal processor 9-02 via the wireless channel.

The terminal processor 9-02 may control a series of processes such that the terminal operates according to the aforementioned embodiments of the disclosure. For example, the terminal receiver 9-00 may receive scheduling information from the BS, and the terminal processor 9-02 may recognize the number of coding bits of UCI according to the number of scheduled CBs and may perform UCI mapping.

Afterward, the terminal transmitter 9-04 may deliver a scheduled PUSCH and UCI to the BS.

FIG. 10 is a block diagram of a BS according to an embodiment.

As illustrated in FIG. 10, the BS may include a BS receiver 10-01, a BS transmitter 10-05, and a BS processor 10-03. The BS receiver 10-01 and the BS transmitter 10-05 may be collectively referred to as a transceiver. The transceiver may transmit or receive a signal to or from a terminal. The signal may include control information and data. In this regard, the transceiver may include an RF transmitter for up-converting and amplifying a frequency of a transmitted signal, and an RF receiver for amplifying low-noise and down-converting a frequency of a received signal. The transceiver may receive a signal via a wireless channel, may output the signal to the BS processor 10-03, and may transmit a signal output from the BS processor 10-03 via the wireless channel.

The BS processor 10-03 may control a series of processes such that the BS operates according to the aforementioned embodiments of the disclosure. For example, the BS processor 10-03 may determine the number of CBs to be scheduled, may determine the number of bits for coding UCI according to the scheduled CBs, and may control a PUSCH and UCI to be mapped to physical resources. Afterward, the BS transmitter 10-05 may transmit scheduling control information and data, and the BS receiver 10-01 may receive a PUSCH and UCI with scheduling information.

While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. A method of a terminal in a wireless communication system, the method comprising:

receiving downlink control information (DCI) for scheduling physical uplink shared channel (PUSCH) transmission;

determining a number of coded modulation symbols per layer for transmission of uplink control information (UCI), based on a number of code blocks associated with an uplink shared channel (UL-SCH), $C_{UL-SCH}$, a value $K_r$ for an r-th code block of the code blocks and a number of bits of the UCI, wherein in case that the DCI includes code block group transmission information (CBGTI) and the CBGTI indicates that the r-th code block associated with the UL-SCH of the PUSCH transmission is not for transmission, the value $K_r$ is determined as 0, and else, the value $K_r$ is determined as a size of the r-th code block for the UL-SCH of the PUSCH transmission; and transmitting, to a base station, the UCI a PUSCH based on the number of coded modulation symbols per layer.

2. The method of claim 1, wherein the number of coded modulation symbols per layer for transmission of the UCI is determined based on $$\left[ \frac{(O_{UCI} + L_{UCI}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r} \right],$$

$O_{UCI}$ is the number of bits of the UCI,
$L_{UCI}$ is a number of CRC bits added to the UCI $$M_{SC}^{UCI}(l)$$

is a number of resource elements used for transmission of the UCI, $$N_{symbol,all}^{PUSCH}$$

is a number of symbols assigned for the PUSCH transmission, and $$\beta_{offset}^{PUSCH}$$

in an offset for the PUSCH.

3. The method of claim 1, further comprising identifying a configuration for code block group transmission,
wherein the configuration for the code block group transmission comprises a maximum number of code-block-groups associated with a transport block.

4. The method of claim 1, wherein the UCI includes at least one of hybrid automatic repeat request-acknowledgement (HARQ-ACK), channel state information (CSI) part 1, or CSI part 2.

5. A method of a base station in a wireless communication system, the method comprising:
transmitting downlink control information (DCI) for scheduling physical uplink shared channel (PUSCH) transmission; and
receiving, from a terminal, uplink control information (UCD) on a PUSCH, based on a number of coded modulation symbols per layer for transmission of the UCI,
wherein the number of coded modulation symbols per layer for transmission of the UCI is determined based on a number of code blocks associated with an uplink shared channel (UL-SCH), $C_{UL-SCH}$, a value $K_r$ for an r-th code block of the code blocks and a number of bits of the UCI, wherein in case that the DCI includes code block group transmission information (CBGTI) and the CBGTI indicates that the r-th code block associated with the UL-SCH of the PUSCH transmission is not for transmission, the value $K_r$ is determined as 0, and else, the value $K_r$ is determined as a size of the r-th code block for the UL-SCH of the PUSCH transmission.

6. The method of claim 5, wherein the number of coded modulation symbols per layer for transmission of the UCI is determined based on $$\left[ \frac{(O_{UCI} + L_{UCI}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r} \right],$$

$O_{UCI}$ is the number of bits of the UCI,
$L_{UCI}$ is a number of CRC bits added to the UCI, $$M_{SC}^{UCI}(l)$$

is a number of resource elements used for transmission of the UCI, $$N_{symbol,all}^{PUSCH}$$

is a number of symbols assigned for the PUSCH transmission, and $$\beta_{offset}^{PUSCH}$$

is an offset for the UCI.

7. The method of claim 5, further comprising transmitting a configuration for code block group transmission, to the terminal,
wherein the configuration for the code block group transmission comprises a maximum number of code-block-groups associated with a transport block.

8. The method of claim 5, wherein the UCI includes at least one of hybrid automatic repeat request-acknowledgement (HARQ-ACK), channel state information (CSI) part 1, or CSI part 2.

9. A terminal in a wireless communication system, the terminal comprising:
a transceiver; and
a processor coupled with the transceiver and configured to:
receive downlink control information (DCI) for scheduling physical uplink shared channel (PUSCH) transmission;
determine a number of coded modulation symbols per layer for transmission of uplink control information (UCI), based on a number of code blocks associated with an uplink shared channel (UL-SCH), $C_{UL-SCH}$, a value $K_r$ for an r-th code block of the code blocks and a number of bits of the UCI, $O_{CSI-1}$, wherein in case that the DCI includes code block group transmission information (CBGTI) and the CBGTI indicates that the r-th code block associated with the UL-SCH of the PUSCH transmission is not for transmission, the value $K_r$ is determined as 0, and else, the value $K_r$ is determined as a size of the r-th code block for the UL-SCH of the PUSCH transmission; and transmit, to a base station, the UCI on a PUSCH based on the number of coded modulation symbols per layer.

10. The terminal of claim 9, wherein the number of coded modulation symbols per layer for transmission of the UCI is determined based on $$\left\lceil \frac{(O_{UCI} + L_{UCI}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r} \right\rceil ,$$

$O_{UCI}$ is the number of bits of the UCI,
$L_{UCI}$ is a number of CRC bits added to the UCI, $$M_{SC}^{UCI}(l)$$

isa number of resource elements used for transmission of the (UCI), $$N_{symbol,all}^{PUSCH}$$

is a number of symbols assigned for the PUSCH transmission, and $$\beta_{offset}^{PUSCH}$$

is an onset for the PUSCH.

11. The terminal of claim 9, wherein the processor is further configured to identify a configuration for code block group transmission,
 wherein the configuration for the code block group transmission comprises a maximum number of code-block-groups associated with a transport block.

12. The terminal of claim 9, wherein the UCI includes at least one of hybrid automatic repeat request-acknowledgement (HARQ-ACK), channel state information (CSI) part 1, or CSI part 2.

13. A base station in a wireless communication system, the base station comprising:
 a transceiver; and
 a processor coupled with the transceiver and configured to:
  transmit downlink control information (DCI) for scheduling physical uplink shared channel (PUSCH) transmission; and receive, from a terminal, uplink control information (UCI) on a PUSCH based on a number of coded modulation symbols per layer for transmission of the UCI, wherein the number of coded modulation symbols per layer for transmission of the UCI is determined based on a number of code blocks associated with an uplink shared channel (UL-SCH), $C_{UL-SCH}$, a value $K_r$ for an r-th code block of the code blocks and a number of bits of the UCI, wherein in case that the DCI includes code block group transmission information (CBGTI) and the CBGTI indicates that the r-th code block associated with the UL-SCH of the PUSCH transmission is not for transmission, the value $K_r$ is determined as 0, and else, the value $K_r$ is determined as a size of the r-th code block for the UL-SCH of the PUSCH transmission.

14. The base station of claim 13, wherein the number of coded modulation symbols per layer for transmission of the UCI is determined based on $$\left\lceil \frac{(O_{UCI} + L_{UCI}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r} \right\rceil ,$$

$O_{UCI}$ is the number of bits of the UCI $L_{UCI}$ a number of CRC bits added to the UCI, $$M_{SC}^{UCI}(l)$$

is a number of resource elements used for transmission of the (UCI), $$N_{symbol,all}^{PUSCH}$$

is a number of symbols assigned for the PUSCH transmission, and $$\beta_{offset}^{PUSCH}$$

is an offset for the UCI.

15. The base station of claim 13, wherein the processor is further configured to transmit a configuration for code block group transmission, to the terminal, and
 wherein the configuration for the code block group transmission comprises a maximum number of code-block-groups associated with a transport block.

16. The base station of claim 13, wherein the UCI includes at least one of hybrid automatic repeat request-acknowledgement (HARQ-ACK), channel state information (CSI) part 1, or CSI part 2.

* * * * *